United States Patent
Grip et al.

(10) Patent No.: US 12,287,065 B2
(45) Date of Patent: Apr. 29, 2025

(54) SYSTEM AND METHOD OF CONTROLLING THE CIRCUMFERENCE OF A PRESSURE TANK MOUNTED WITHIN A VACUUM TANK

(71) Applicant: The Boeing Company, Arlington, VA (US)

(72) Inventors: Robert E. Grip, Rancho Palos Verdes, CA (US); Aaron J. Kutzmann, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 213 days.

(21) Appl. No.: 18/336,992

(22) Filed: Jun. 17, 2023

(65) Prior Publication Data
US 2024/0418319 A1    Dec. 19, 2024

(51) Int. Cl.
*F17C 13/00* (2006.01)
*B64D 37/06* (2006.01)

(52) U.S. Cl.
CPC ............ *F17C 13/001* (2013.01); *B64D 37/06* (2013.01); *F17C 2201/0109* (2013.01); *F17C 2201/0176* (2013.01); *F17C 2201/035* (2013.01); *F17C 2203/014* (2013.01); *F17C 2203/015* (2013.01); *F17C 2203/016* (2013.01); *F17C 2203/0391* (2013.01); *F17C 2221/012* (2013.01); *F17C 2221/033* (2013.01); *F17C 2223/013* (2013.01); *F17C 2260/042* (2013.01); *F17C 2270/0189* (2013.01)

(58) Field of Classification Search
CPC . B64D 37/04; B64D 37/06; F17C 3/08; F17C 13/086; F17C 2203/014; F17C 2203/015; F17C 2203/016; F17C 2203/0391; F17C 2260/035; F17C 2260/037; F17C 2260/021; F17C 2260/018; F17C 2201/0176; F17C 2205/0149
See application file for complete search history.

(56) References Cited

U.S. PATENT DOCUMENTS

| | | | |
|---|---|---|---|
| 2,818,191 A | 12/1957 | Ame | |
| 3,243,150 A | 3/1966 | Woodcock | |
| 3,414,153 A | 12/1968 | Leroux | |
| 5,012,948 A | 5/1991 | Van Den Bergh | |
| 2023/0313946 A1 | 10/2023 | Bergan | |

OTHER PUBLICATIONS

PacSci EMC, Corporation, "Pyrotechnic Cable Cutters datasheet," downlaoded on Jun. 15, 2023.

*Primary Examiner* — Timothy D Collins
*Assistant Examiner* — Justin Michael Heston

(57) ABSTRACT

A tank system includes a vacuum tank having a vacuum tank skin, and a pressure tank mounted within the vacuum tank having one or more pressure tank skin segments having a total circumference that is less than that of a complete circle, resulting in one or more longitudinal gaps respectively between the one or more pressure tank skin segments. The tank system includes one or more gap control mechanisms configured to control a width of the one or more longitudinal gaps in a manner facilitating movement of the one or more pressure tank skin segments between at least the following positions: a retracted position in which there is a radial gap between each pressure tank skin segment and the vacuum tank skin, and a fully extended position in which at least a portion of each pressure tank skin segments is in contact with the vacuum tank skin.

20 Claims, 32 Drawing Sheets

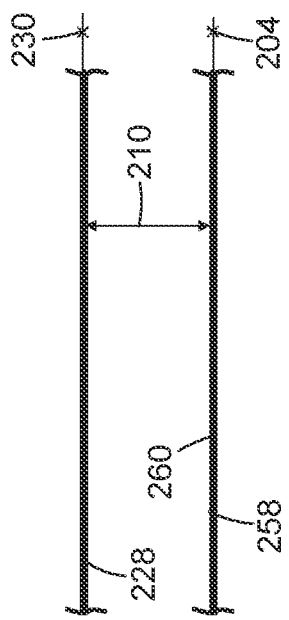
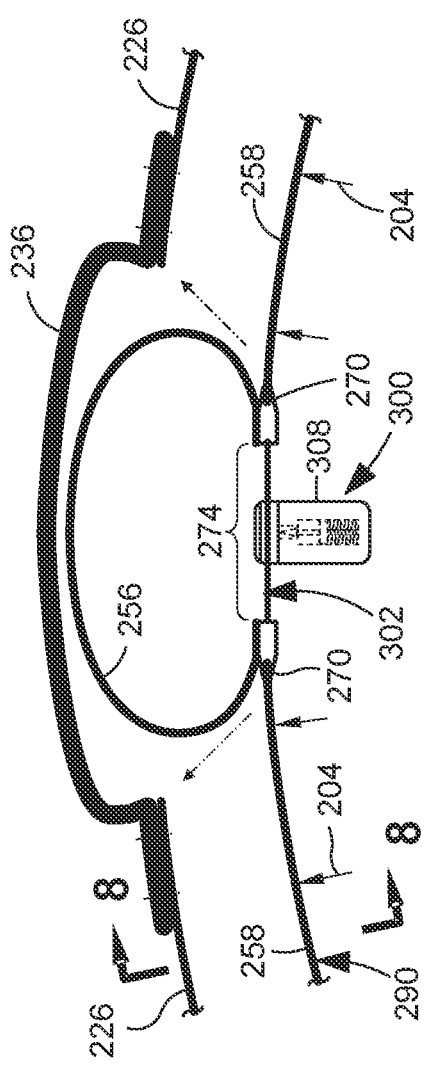
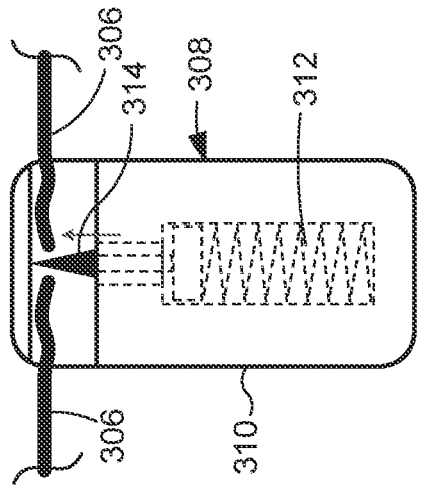
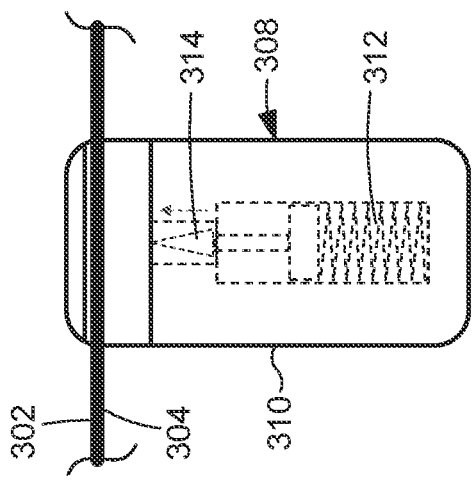
FIG. 8
FIG. 7
FIG. 10
FIG. 9

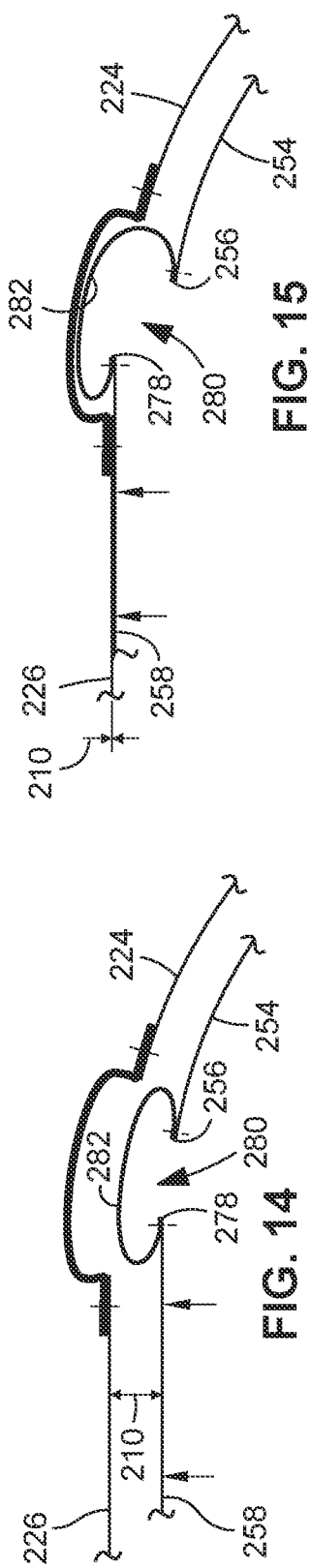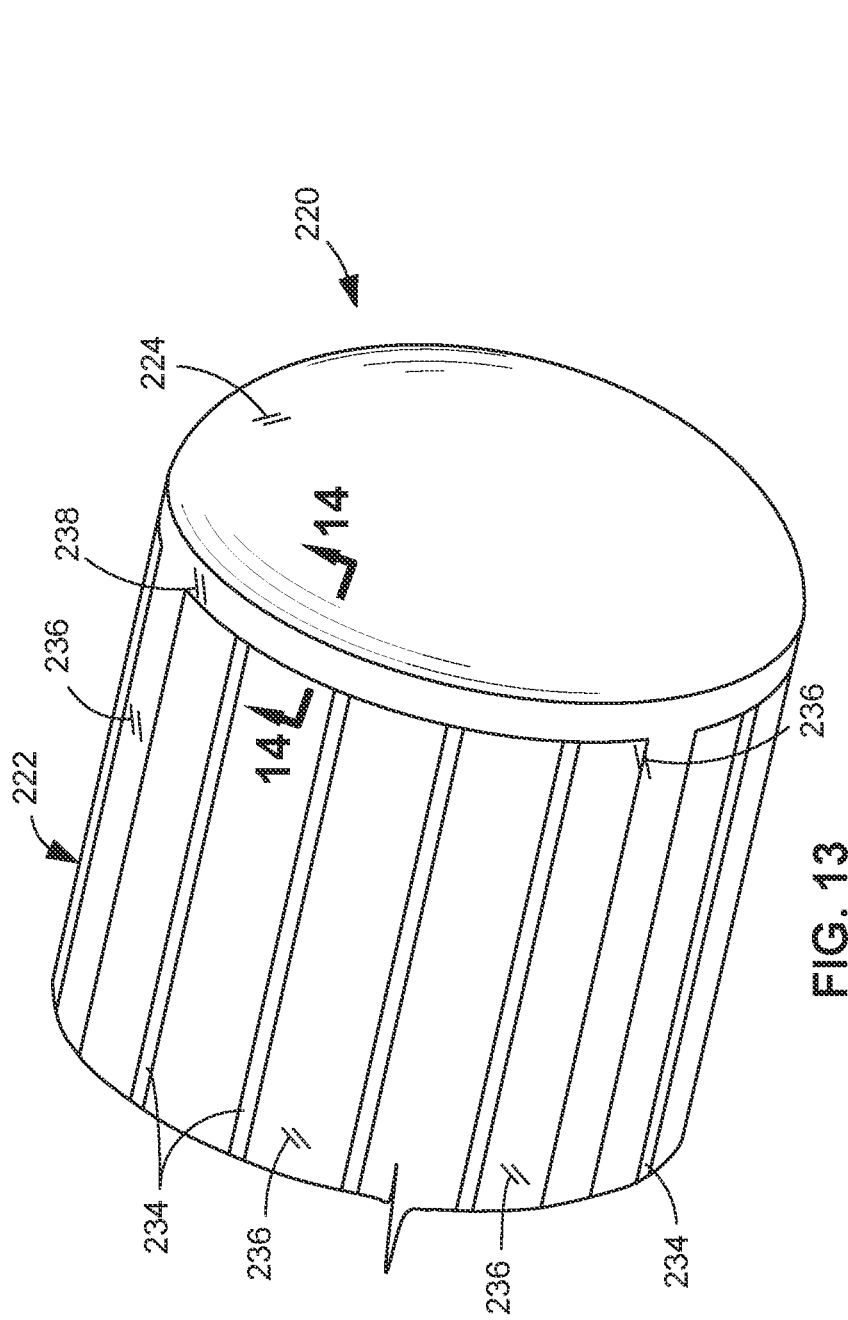

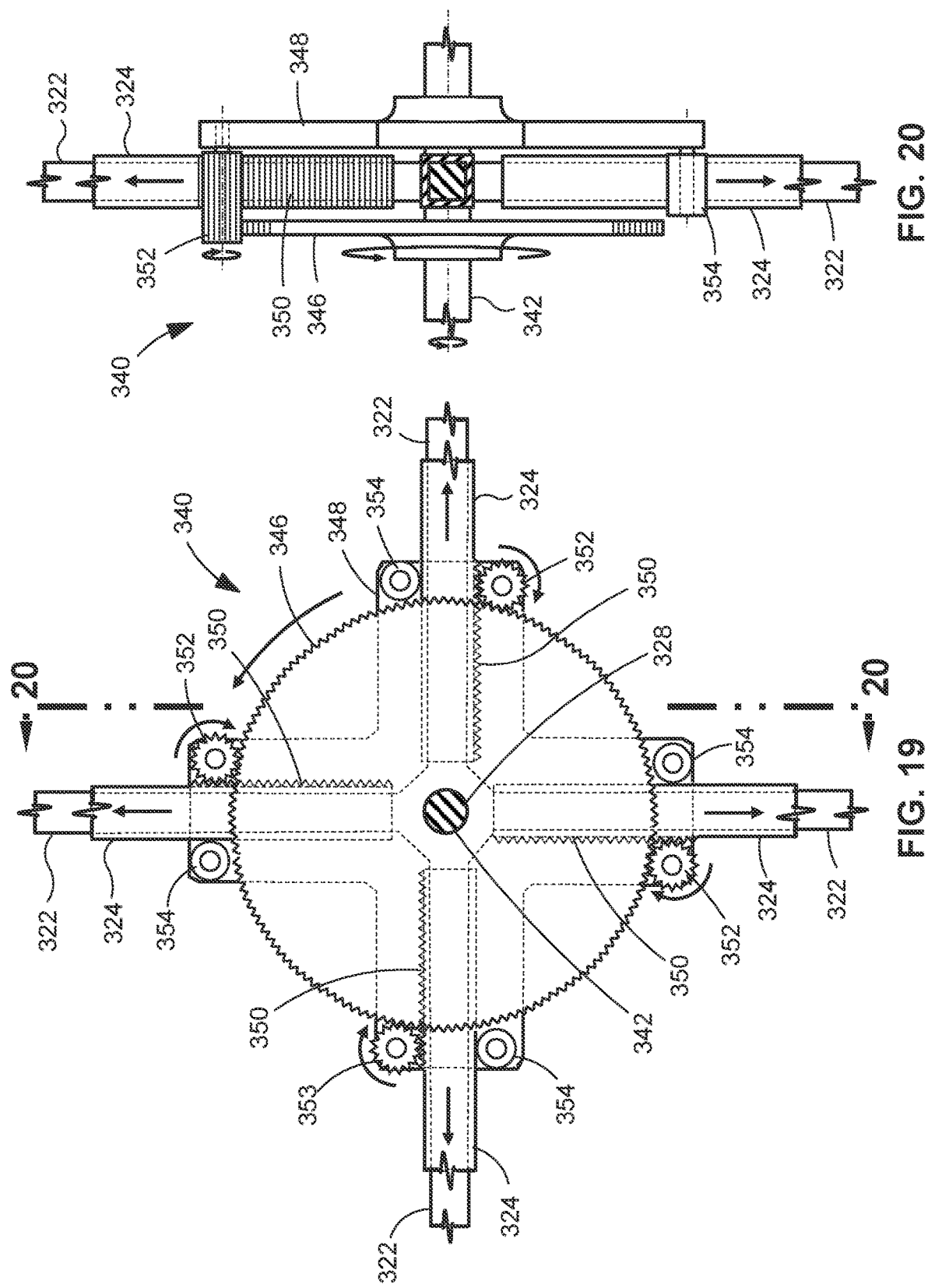

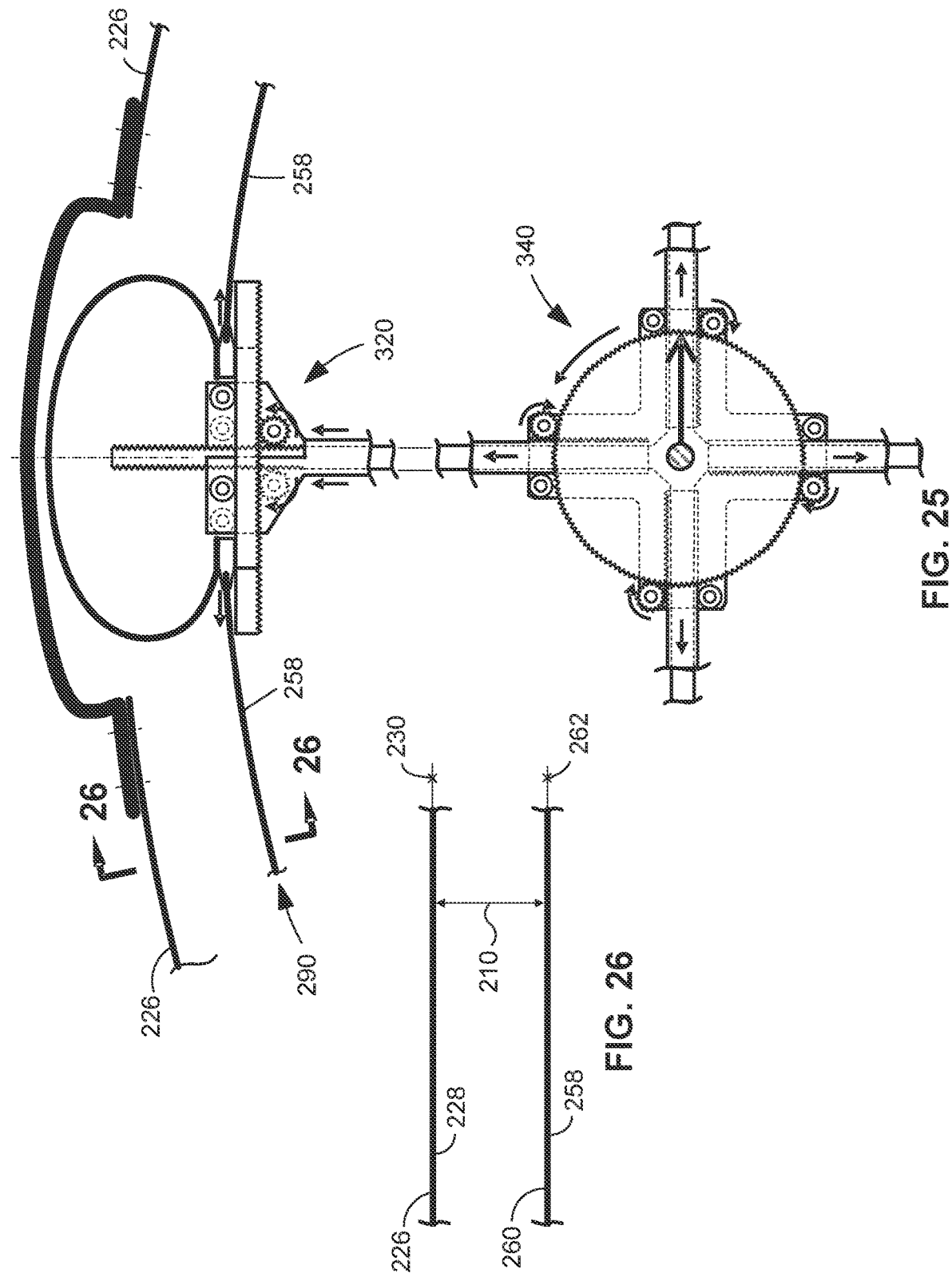

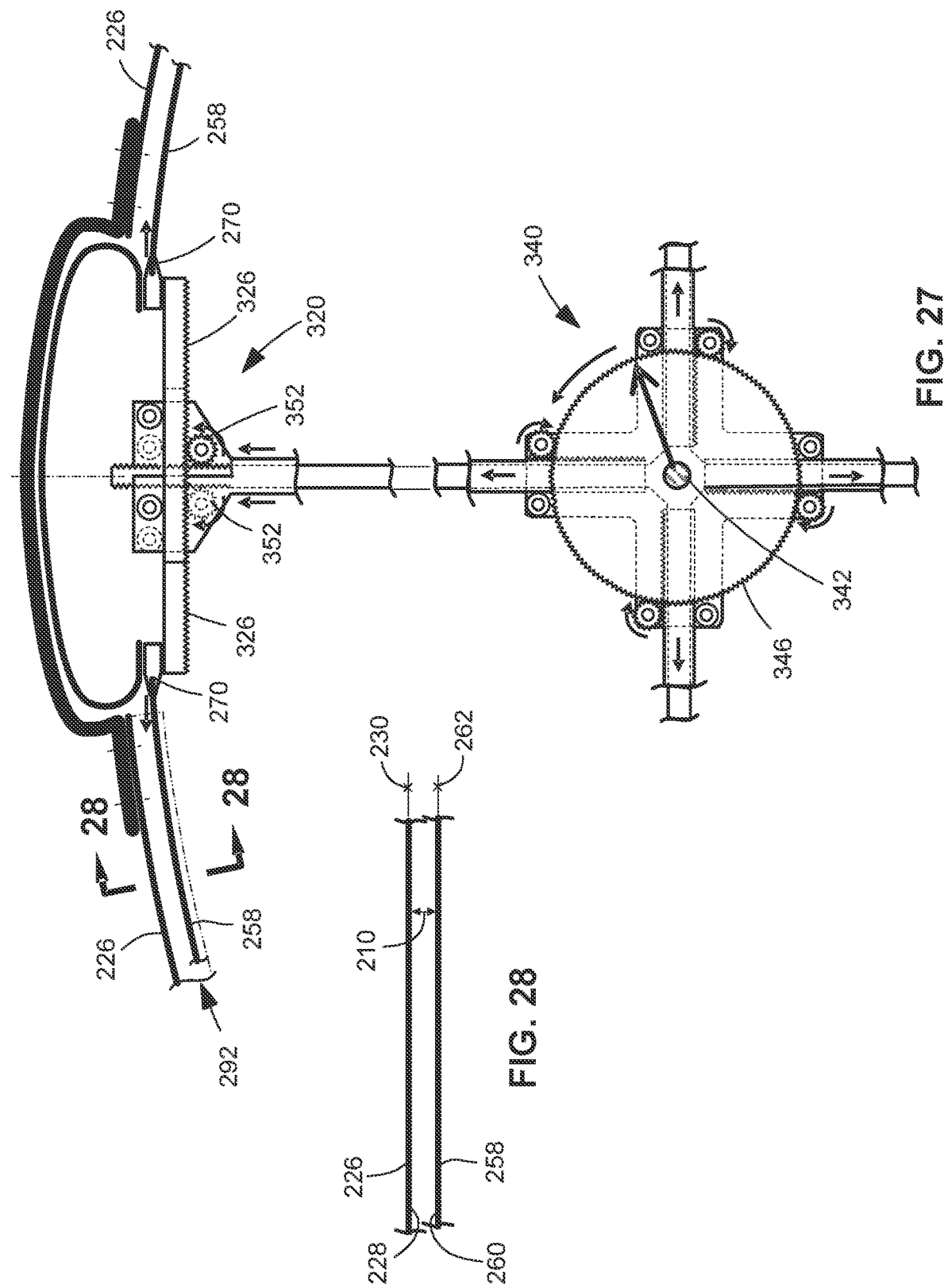

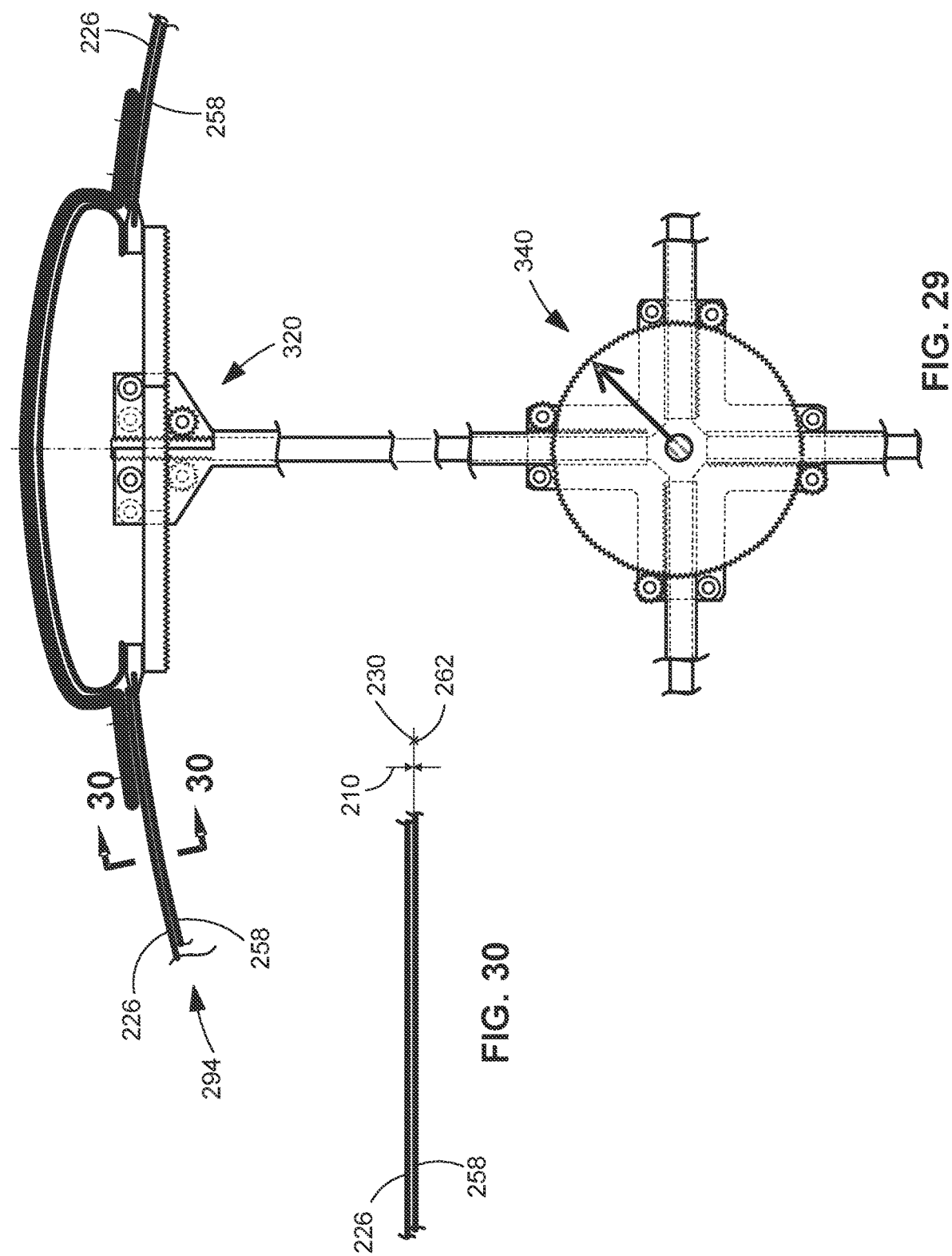

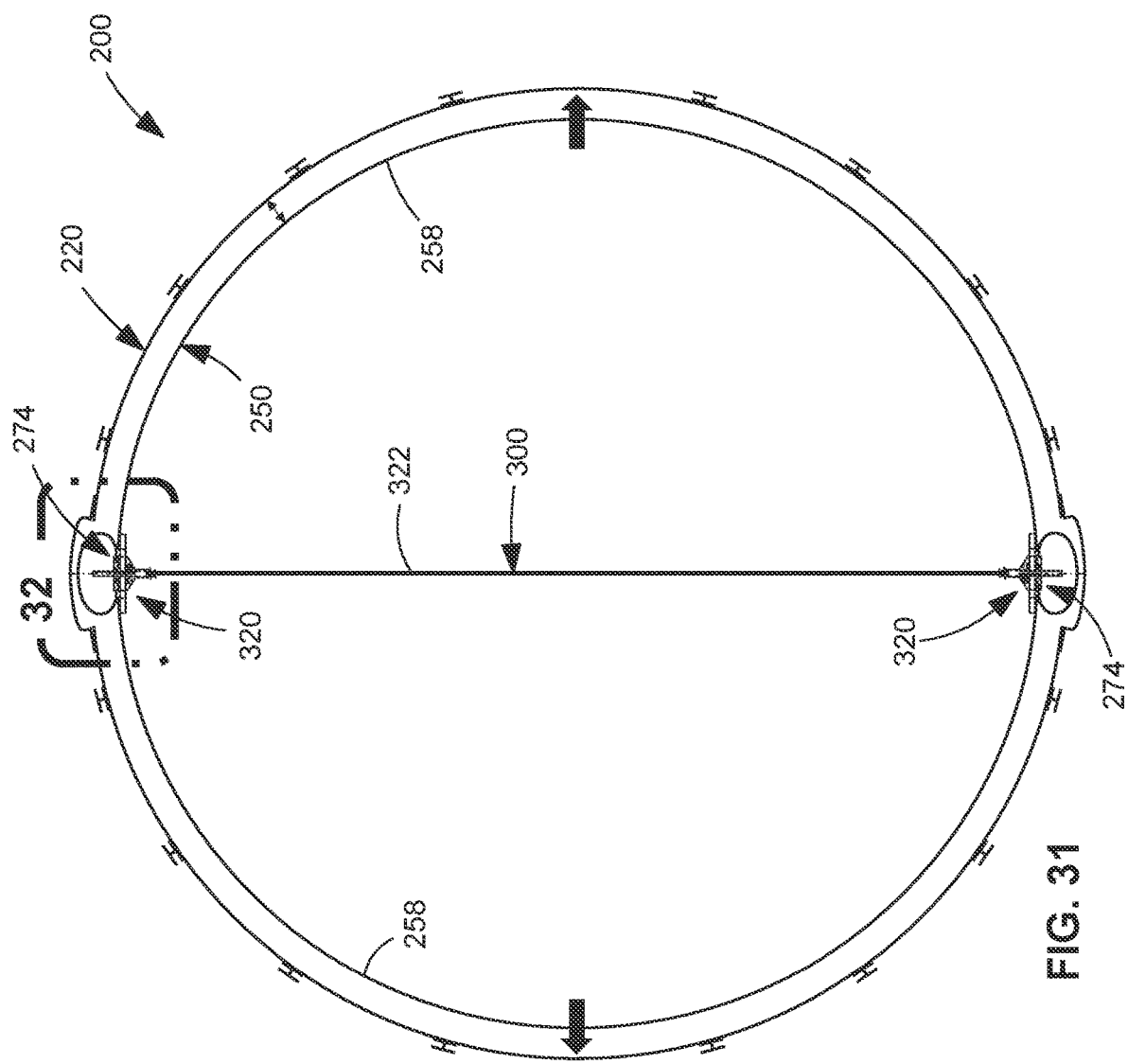

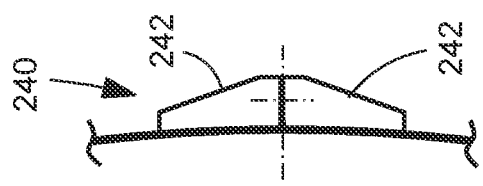
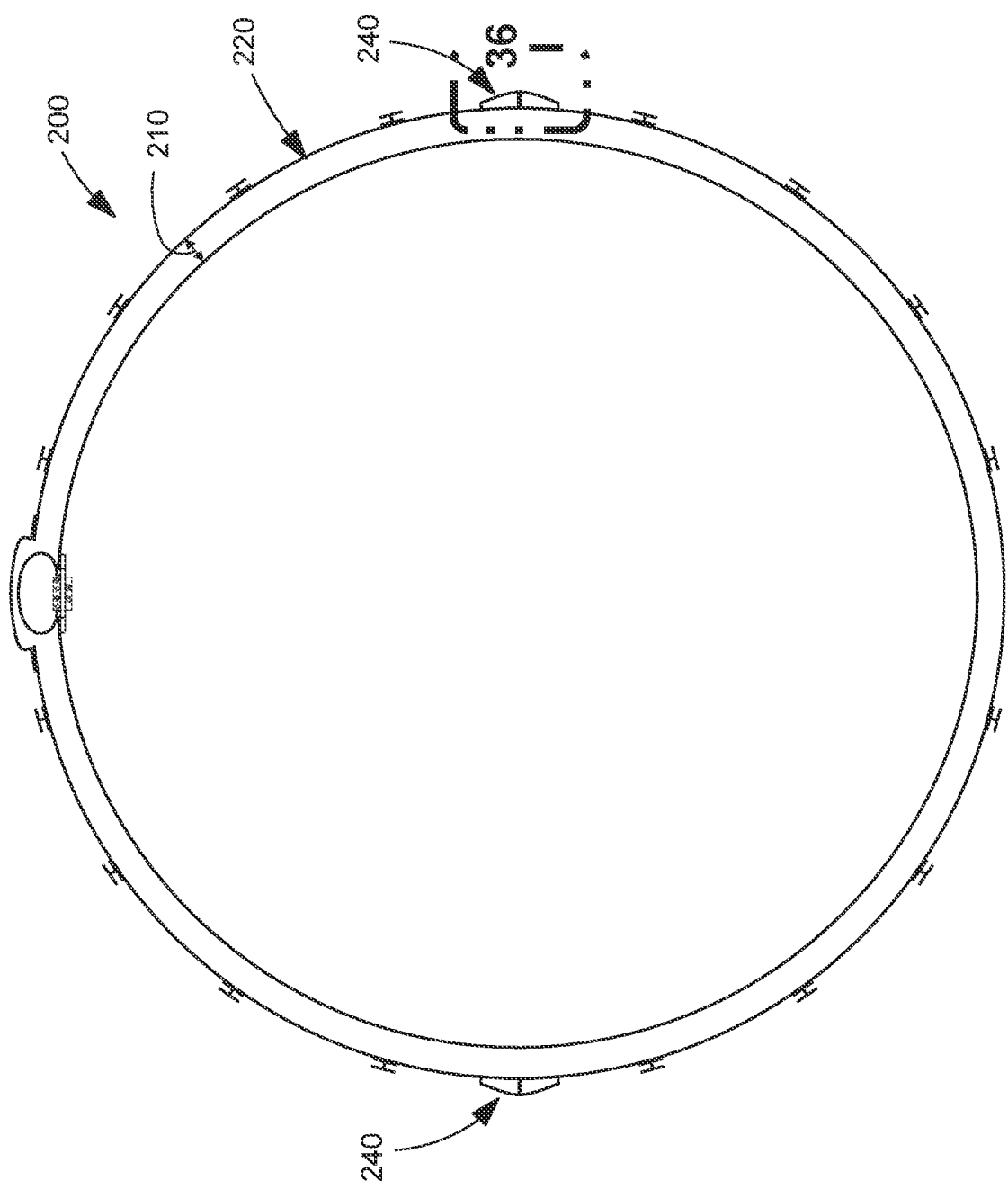

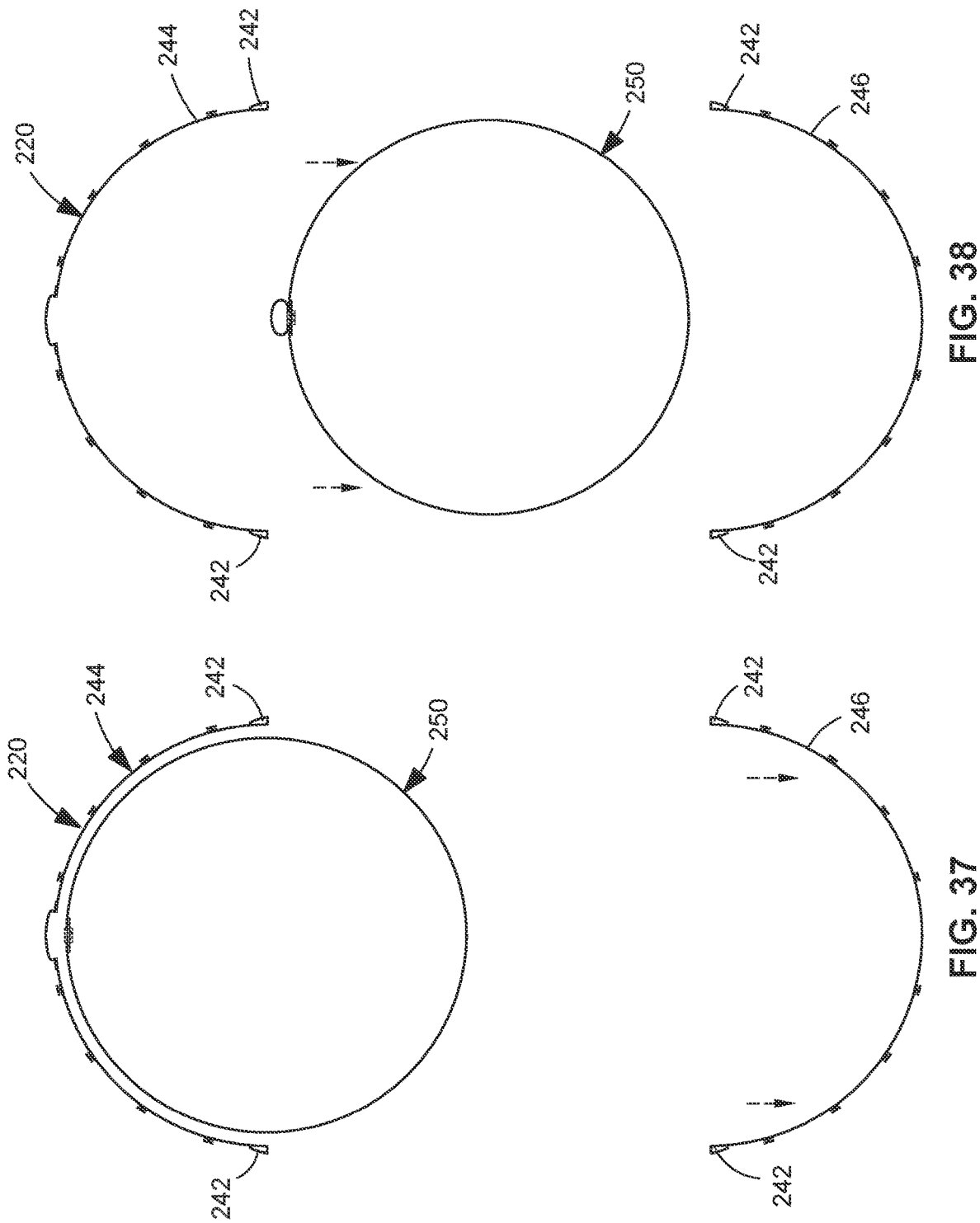

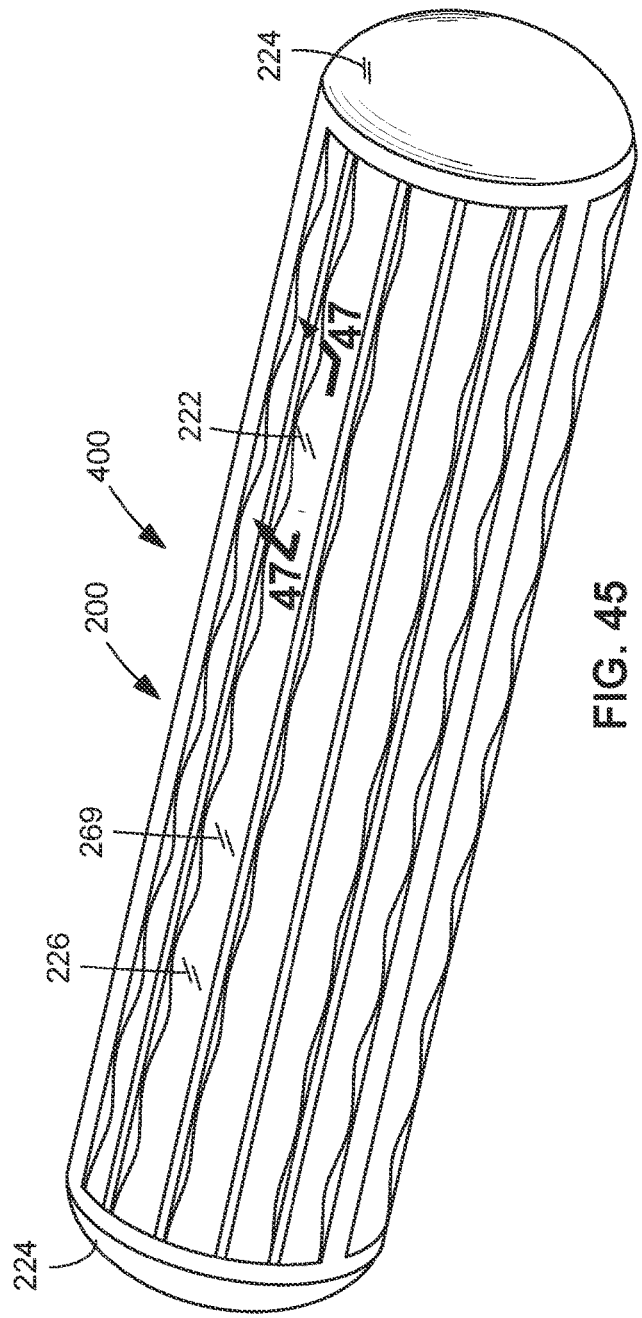
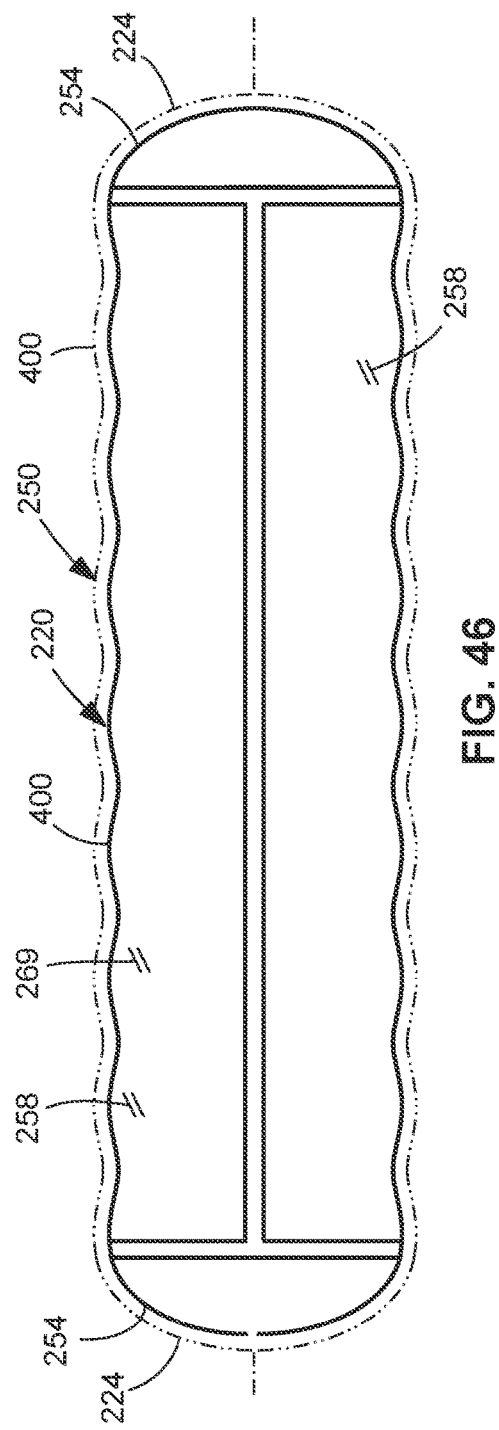
FIG. 45
FIG. 46

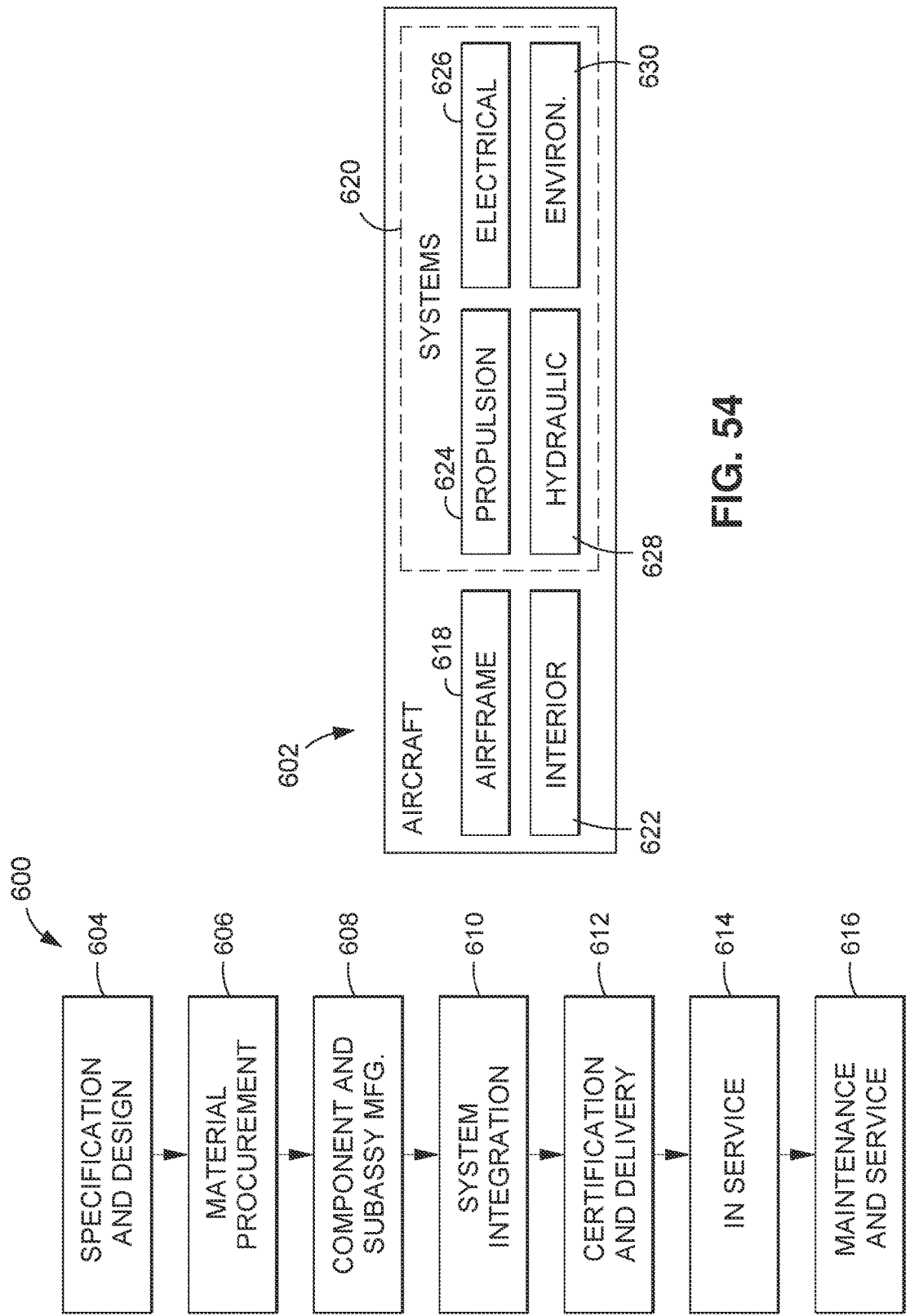

SYSTEM AND METHOD OF CONTROLLING THE CIRCUMFERENCE OF A PRESSURE TANK MOUNTED WITHIN A VACUUM TANK

CROSS-REFERENCE TO RELATED APPLICATIONS

This nonprovisional patent application is related to contemporaneously filed U.S. nonprovisional patent application Ser. No. 18/336,989, titled STRUCTURALLY INTEGRATED VACUUM TANK AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,991, titled SEGMENTED VACUUM JACKETED TANK SYSTEM AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,990, titled TANK SYSTEM HAVING REMOVABLE PLUG ASSEMBLY AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,993, titled SYSTEM AND METHOD OF CONTROLLING THE DEFLECTIONS OF A PRESSURE TANK MOUNTED WITHIN A VACUUM TANK, filed on Jun. 17, 2023, the contents of which are hereby incorporated by reference in their entirety. By mention in this CROSS-REFERENCE TO RELATED APPLICATIONS section, the application is not admitted to be prior art with respect to this application.

FIELD

The present disclosure relates generally to tank systems, and more particularly, to a tank system having a pressure tank mounted within a vacuum tank, and in which the circumference of the pressure tank is adjustable to allow the pressure tank outer surface to move into contact with the vacuum tank inner surface in an emergency condition.

BACKGROUND

Vacuum jacketed tank systems are used for storing cryogenic fluid, such as liquid hydrogen and liquified natural gas. Such tank systems include an internal pressure tank and an external vacuum tank that surrounds the internal pressure tank. To maintain the cryogenic fluid in liquid form and prevent it from transitioning into gaseous form due to conductive heat transfer from the relatively warm vacuum tank to the very cold pressure tank, a radial gap is maintained between the two tanks. The radial gap is under vacuum to prevent convective heat transfer from the vacuum tank to the pressure tank. In this regard, the radial gap between the two tanks defines a vacuum cavity that thermally insulates the pressure tank from relatively warm ambient air surrounding the vacuum tank.

Although existing vacuum jacketed tank systems are effective in storing cryogenic fluid, they pose a safety concern. For example, if the external vacuum tank is breached or ruptures due to an emergency condition or an accident event, the warm ambient air surrounding the vacuum tank will rush into the vacuum cavity. As the warm air comes into contact with the surfaces of the very cold pressure tank, the air will liquefy. If the pressure tank containing liquid hydrogen is also breached, the liquid hydrogen will mix with the liquid air, forming a volatile mixture that can easily ignite with very little energy. For example, a light tap on the tank system or sudden exposure to sunlight can cause the mixture to explode.

As can be seen, there exists a need in the art for a vacuum jacketed tank system that mitigates or eliminates the above-noted safety concern associated with warm air rushing into the vacuum cavity, liquifying, and mixing with the cryogenic fluid from the pressure tank.

SUMMARY

The above-noted needs associated with vacuum jacketed tank systems are addressed by the present disclosure, which provides a tank system having a vacuum tank having a vacuum tank skin, and a pressure tank mounted within the vacuum tank having one or more pressure tank skin segments having a total circumference that is less than that of a complete circle, resulting in one or more longitudinal gaps respectively between the one or more pressure tank skin segments. The tank system includes one or more gap control mechanisms configured to control a width of the one or more longitudinal gaps in a manner facilitating movement of the one or more pressure tank skin segments between at least the following positions: a retracted position in which there is a radial gap between each pressure tank skin segment and the vacuum tank skin, and a fully extended position in which at least a portion of each pressure tank skin segment is in contact with the vacuum tank skin.

Also disclosed is an aircraft having a fuselage, and a tank system included with the fuselage. The tank system has a vacuum tank having a vacuum tank skin. The tank system also has a pressure tank mounted within the vacuum tank and having one or more pressure tank skin segments having a total circumference that is less than that of a complete circle, resulting in one or more longitudinal gaps respectively between the one or more pressure tank skin segments. The one or more gap control mechanisms are configured to control a width of the one or more longitudinal gaps in a manner facilitating movement of the one or more pressure tank skin segments between at least the following positions: a retracted position in which there is a radial gap between each pressure tank skin segment and the vacuum tank skin, and a fully extended position in which the pressure tank skin segments are in contact with the vacuum tank skin.

Also disclosed is a method of varying the circumference of a pressure tank mounted within a vacuum tank. The method includes adjusting, using one or more gap control mechanisms, a width of one or more longitudinal gaps respectively between one or more pressure tank skin segments of the pressure tank, in a manner causing movement of the one or more pressure tank skin segments between at least the following positions: a retracted position in which there is a radial gap respectively between each pressure tank skin segment and a vacuum tank skin of the vacuum tank, and a fully extended position in which the pressure tank skin segments are in contact with the vacuum tank skin.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 7 is a magnified view of the portion of the tank system identified by reference numeral 7 of FIG. 5 and illustrating the pressure tank segments in a retracted position in which there is a radial gap between each pressure tank skin segments and the vacuum tank skin, forming a longitudinal gap which is sealed by a longitudinal seal, and further illustrating an example of a gap control mechanism configured as a skin segment coupler (e.g., a cable) interconnecting the skin segment longitudinal edges respectively located on opposite sides of the longitudinal gap;

FIG. 8 is a longitudinal sectional view taken along line 8-8 of FIG. 7, and illustrating the radial gap between the pressure tank skin segment and the vacuum tank skin;

FIG. 9 is a magnified view of an example of a gap control mechanism comprising the above-mentioned skin segment coupler (i.e., a cable), and further comprising a coupler adjustment device configured as a cable cutter, shown in a deactivated position;

FIG. 10 shows the cable cutter of FIG. 9 in an activated position resulting in severing of the cable into separate cable portions;

FIG. 13 is a perspective view of a portion of one end of the tank system;

FIG. 14 is a sectional view taken along line 14-14 of FIG. 13, and illustrating an end gap seal for sealing an end gap formed between a skin segment radial edge of the pressure tank skin segment in the retracted position and an end portion radial edge of the pressure tank end portion;

FIG. 15 shows the end gap seal received within an end recess formed in the vacuum tank skin after the pressure tank skin segment has moved into the fully extended position;

FIG. 19 is a magnified view of the center mechanism identified by reference numeral 19 of FIG. 18, and illustrating a center gear mounted on a drive shaft and engaged to a plurality of pinion gears respectively engaged to a plurality of radial members respectively mounted on a plurality of inner spines extending respectively to the plurality of outer mechanisms at the longitudinal gaps;

FIG. 20 is a side view of the center mechanism of FIG. 19;

FIG. 25 shows the movement of the components of the center mechanism and the outer mechanism with the pressure tank skin segments starting from the retracted position;

FIG. 26 is a longitudinal sectional view of the pressure tank skin segments and the vacuum tank skin showing the radial gap when the pressure tank skin segments are in the retracted position;

FIG. 27 shows movement of the components of the center mechanism and the outer mechanism to move the pressure tank skin segments to the partially extended position;

FIG. 28 shows the reduced size of the radial gap between the pressure tank skin segments and the vacuum tank skin when the pressure tank skin segments are in the partially extended position in which the pressure tank maximum diameter is greater than the vacuum tank minimum diameter and less than the vacuum tank maximum diameter;

FIG. 29 shows the movement of the components of the center mechanism and the outer mechanism to move the pressure tank skin segments to the fully extended position;

FIG. 30 shows the pressure tank skin segments in direct contact with the vacuum tank skin, thereby eliminating the radial gap;

FIG. 31 is an axial sectional view of the tank system showing an example of the gap control mechanism comprising diametrically opposed outer mechanisms interconnecting 2 pressure tank skin segments;

FIG. 35 is an axial sectional view of the tank system in which the vacuum tank as a pair of vacuum tank longitudinal joints respectively on diametrically opposite sides of the pressure tank;

FIG. 36 is a magnified view of one of the vacuum tank longitudinal joints identified by reference numeral 36 of FIG. 35;

FIG. 37 shows a lower tank half of the vacuum tank lowered away from an upper tank half to expose the pressure tank;

FIG. 38 shows the pressure tank lowered away from the upper tank half;

FIG. 45 is a perspective view of an example of a tank system in which the pressure tank skin segments and the vacuum tank skin each having a sinusoidal cross section in the longitudinal or lengthwise direction;

FIG. 46 is a side view of the tank system of FIG. 45 illustrating the profile of the vacuum tank in phantom lines;

FIG. 53 is an illustration of a flow diagram of an exemplary aircraft manufacturing and service method; and FIG. 54 is an illustration of an exemplary block diagram of an aircraft.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
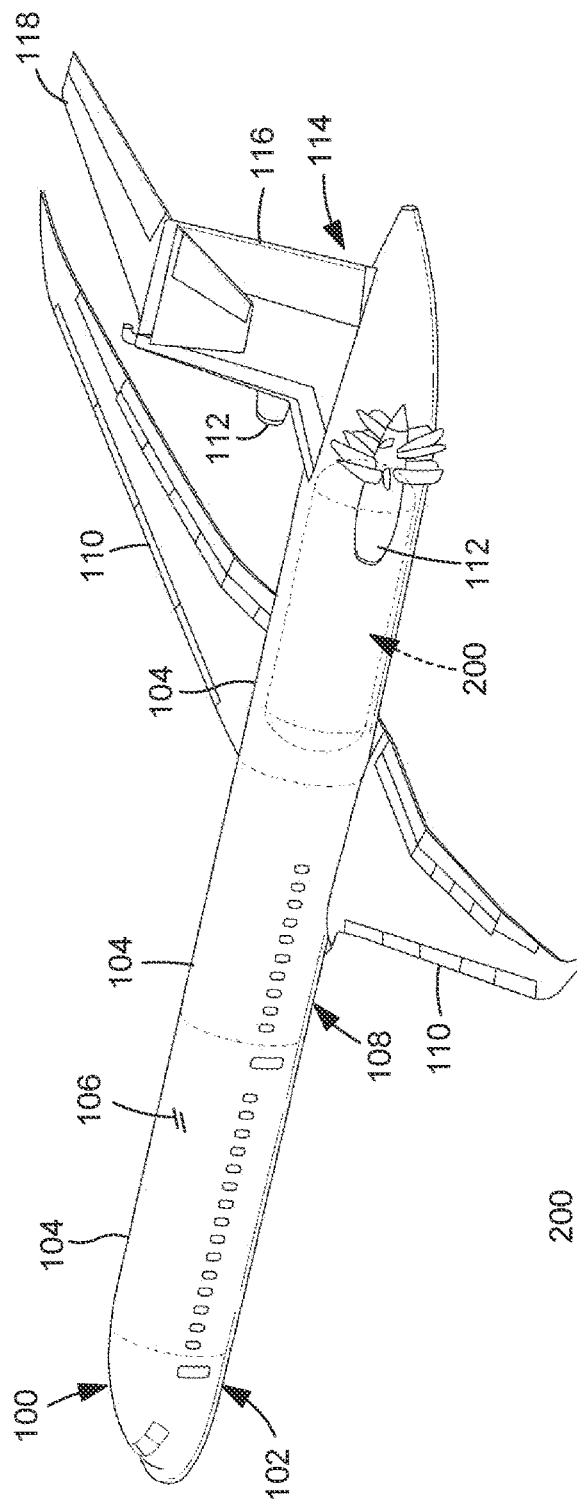
FIG. 1 shows an example of an aircraft having a vacuum jacketed tank system.
Figure 2:
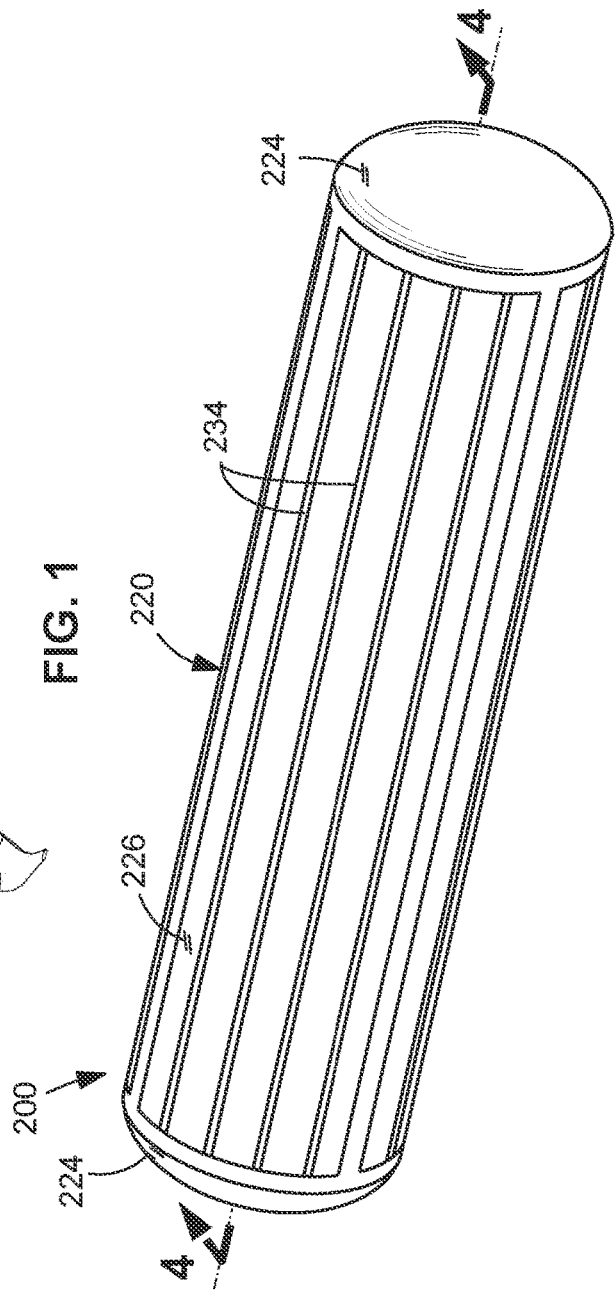
FIG. 2 is a perspective view of an example of the presently disclosed tank system.

Referring now to the drawings which illustrate various examples of the disclosure, shown in FIG. 1 is an example of an aircraft 100 containing a vacuum jacketed tank system 200 as disclosed herein. The vacuum jacketed tank system 200 is also be referred to throughout the present disclosure as a tank system 200. In FIG. 1, the aircraft 100 includes a fuselage 102 having an empennage 114. The empennage 114 includes a vertical tail 116 (i.e., a vertical fin and a rudder) and a horizontal tail 118 (e.g., a horizontal stabilizer and elevators). In addition, the aircraft 100 includes a pair of wings 110 and a pair propulsion units 112 which, in the example shown, are mounted on opposite sides of the fuselage 102 near the empennage 114.

In the example shown, the fuselage 102 is comprised of a plurality of fuselage barrel sections 104 joined end to end. The fuselage barrel sections 104 each include a fuselage external skin 106 which functions as the external aerodynamic surface of the fuselage 102. The presently disclosed tank system 200 can be structurally integrated with one or more of the fuselage barrel sections 104. In the example shown, the tank system 200 is structurally integrated with the fuselage barrel section 104 located immediately aft of the cabin 108, which can be configured to contain passengers and/or cargo.

Referring to FIGS. 2-5, the tank system 200 is comprised of an internal pressure tank 250 mounted within an external vacuum tank 220. The internal pressure tank 250 is configured to contain cryogenic fluid such as liquid hydrogen, liquefied natural gas (LNG), or any other cryogenic fluid. In the example of an aircraft 100, the cryogenic fluid (e.g., liquid hydrogen or LNG) can be burned in propulsion units configured as turbine engines. Alternatively, the aircraft 100 can include a fuel cell (not shown) for converting liquid hydrogen or LNG into electricity for powering electric propulsion units. The pressure tank 250 must be kept at a very low temperature (e.g., −162 degrees Celsius for LNG; −253 degrees Celsius for liquid hydrogen) in order to maintain the cryogenic fluid in liquid form at a reasonable internal pressure (e.g., 25 psi at limit load; 37.5 psi at ultimate load). The primary stresses in the pressure tank 250 are tension stresses in the longitudinal or lengthwise direction, and in the hoop or circumferential direction.

The external vacuum tank 220 surrounds the internal pressure tank 250. During normal operating conditions (e.g., normal flight conditions), a radial gap 210 (FIGS. 4-5) is maintained between the pressure tank 250 and the vacuum tank 220. The vacuum tank 220 is under vacuum pressure, resulting in a vacuum cavity 208 (FIGS. 4-5) in the radial gap 210 between the pressure tank 250 and the vacuum tank 220. The vacuum cavity 208 thermally insulates the pressure tank 250 from relatively warm ambient air 206 (FIG. 5) surrounding the vacuum tank 220. In this regard, the vacuum cavity 208 reduces or prevents heat transfer into the cold pressure tank 250 from the relatively warm ambient air 206 surrounding the vacuum tank 220, and thereby reduces or prevents the cryogenic fluid from transitioning into gaseous form. The vacuum tank 220 is under external pressure because of the pressure difference between the vacuum cavity 208 and external air pressure acting on the vacuum tank 220. As a result, the primary stresses on the vacuum tank 220 are compression stresses in the longitudinal or lengthwise direction, and in the hoop or circumferential direction.

Figure 3:
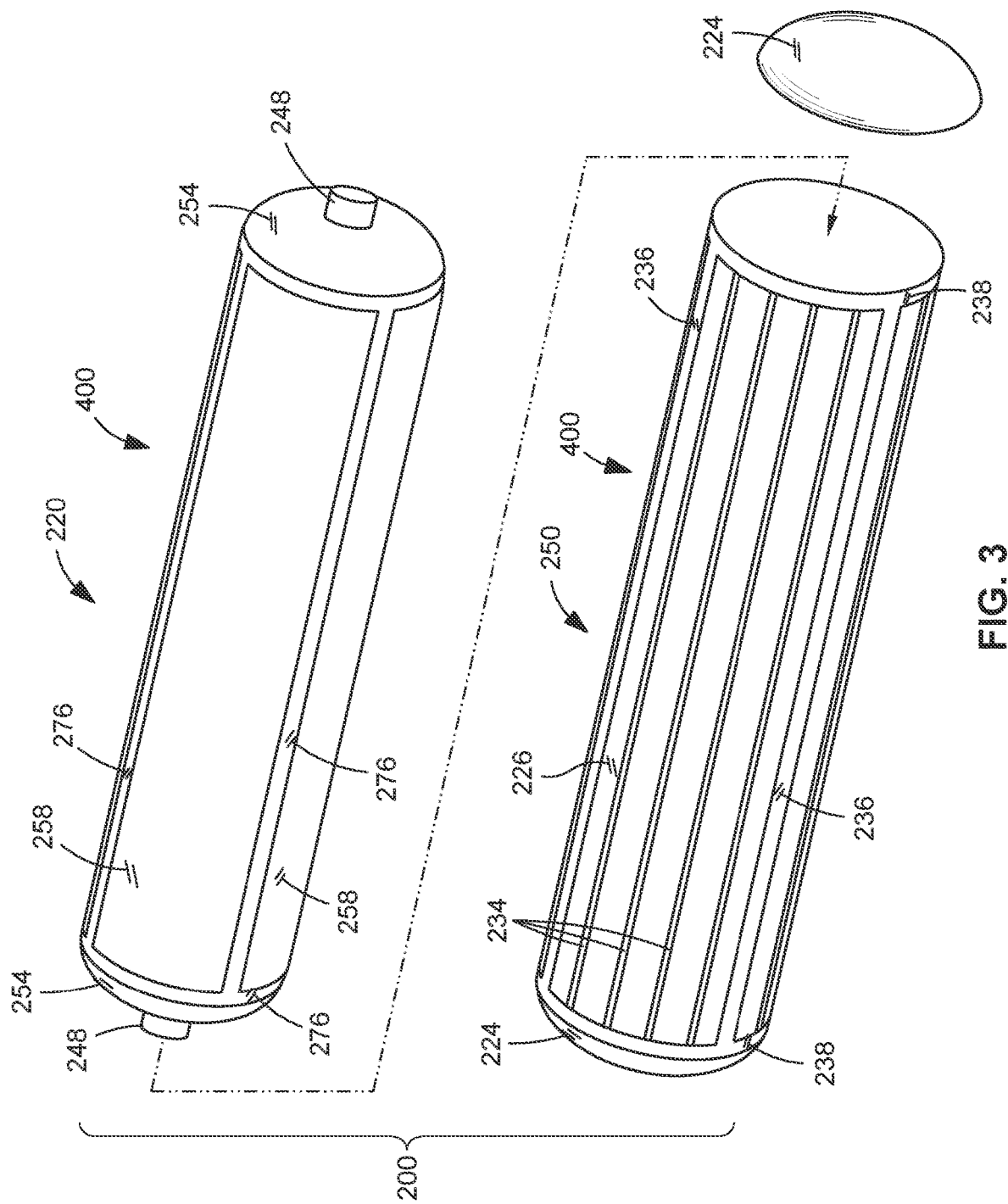
FIG. 3 is an exploded view of an example of the tank system comprising a vacuum tank, and a pressure tank configured to be mounted within the vacuum tank and comprised of one or more pressure tank skin segments.
Figure 4:
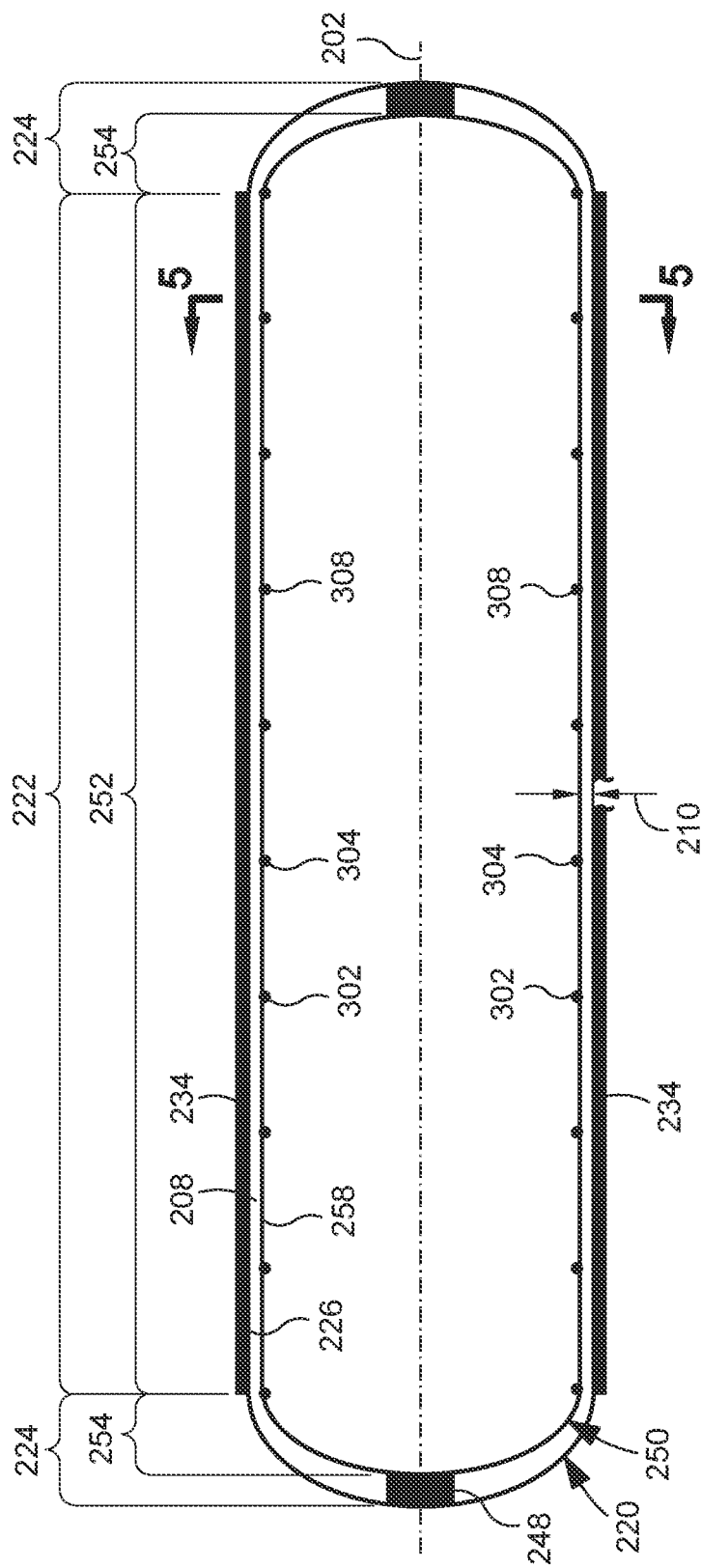
FIG. 4 is a longitudinal section view of the tank system of FIGS. 2-3 illustrating a radial gap between the internal pressure tank and the external vacuum tank.

In the example of FIGS. 3-4, the pressure tank 250 is mounted within the vacuum tank 220 via a tank attach fitting 248 at each end of the tank system 200. In the example shown, each tank attach fitting 248 is centered on the tank axis 202 (FIG. 4), and each tank attach fitting 248 extends between a vacuum tank end portion 224 and a pressure tank end portion 254. Although FIGS. 3-4 show the pressure tank 250 supported by a tank attach fitting 248 at each end, the tank system 200 may incorporate any one of a variety of alternative arrangements for supporting the pressure tank 250 within the vacuum tank 220.

Although described in the context of an aircraft 100, the presently disclosed tank system 200 can be implemented in any one of a variety of alternative vehicular applications, including, but not limited to any type of fixed-wing aircraft or rotary-wing aircraft, any type of watercraft, and any type of land-based vehicle including trains, automobiles, buses, and trucks. Furthermore, the presently disclosed tank system 200 can be implemented in any one of a variety of non-vehicular applications including, but not limited to, power plants, power stations, or any other non-vehicular or stationary application.

Figure 5:
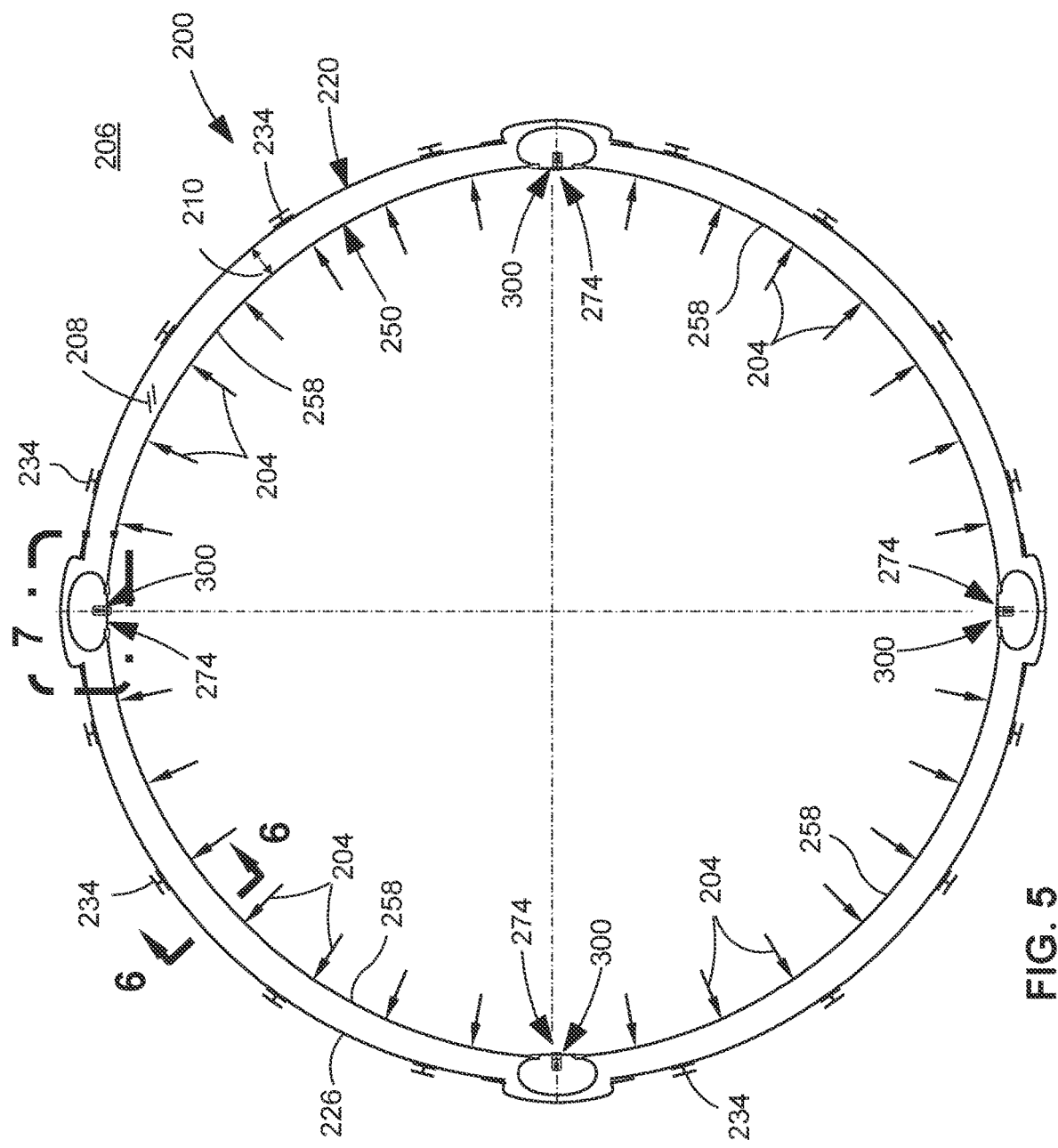
FIG. 5 is an axial section view of the tank system of FIG. 4 illustrating the radial gap between the pressure tank skin segments and the vacuum tank skin, and further illustrating a plurality of gap control mechanisms configured to move the pressure tank skin segments between a retracted position and a fully extended position.
Figure 6:
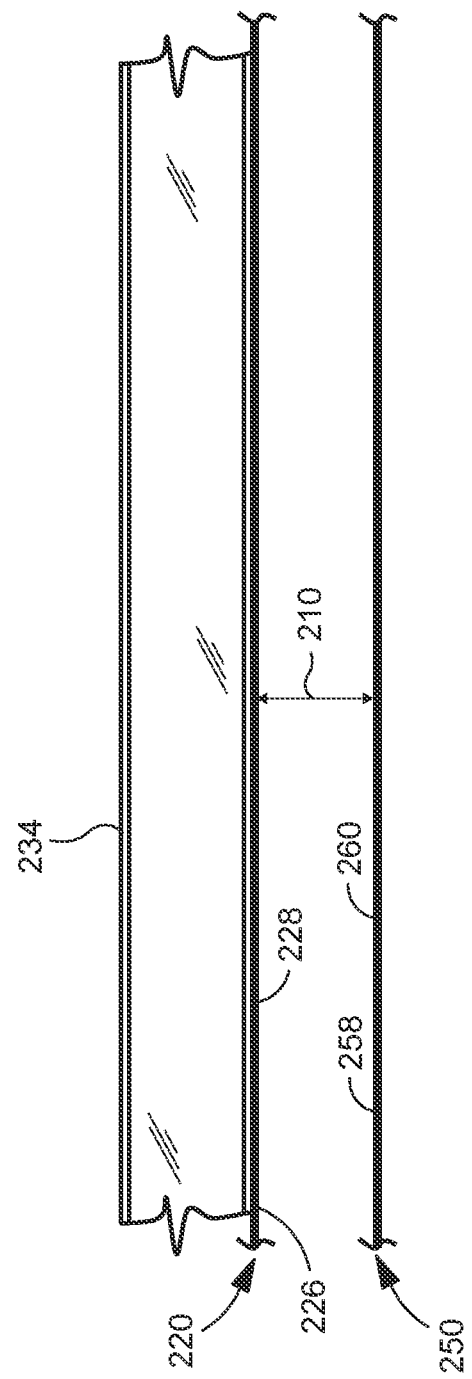
FIG. 6 is a sectional view taken along line 6-6 of FIG. 5 and illustrating the tank system in an example wherein the pressure tank skin segments and the vacuum tank skin each have a straight cross section in the longitudinal or lengthwise direction.

Referring to FIGS. 2-6, the tank system 200, including the vacuum tank 220 and the pressure tank 250, has a spherocylindrical shape. The vacuum tank 220 has a vacuum tank main portion 222 (FIG. 4) extending between the vacuum tank end portions 224 (FIG. 4). The vacuum tank main portion 222 has a vacuum tank skin 226 (FIG. 5). In the example of an aircraft 100, the vacuum tank skin 226 can function as the external aerodynamic surface of the fuselage 102. Alternatively, the vacuum tank 220 can optionally be supported by a fuselage structure (not shown), such as a semi-monocoque structure, that also functions as the external aerodynamic surface of the fuselage 102.

Figure 39:
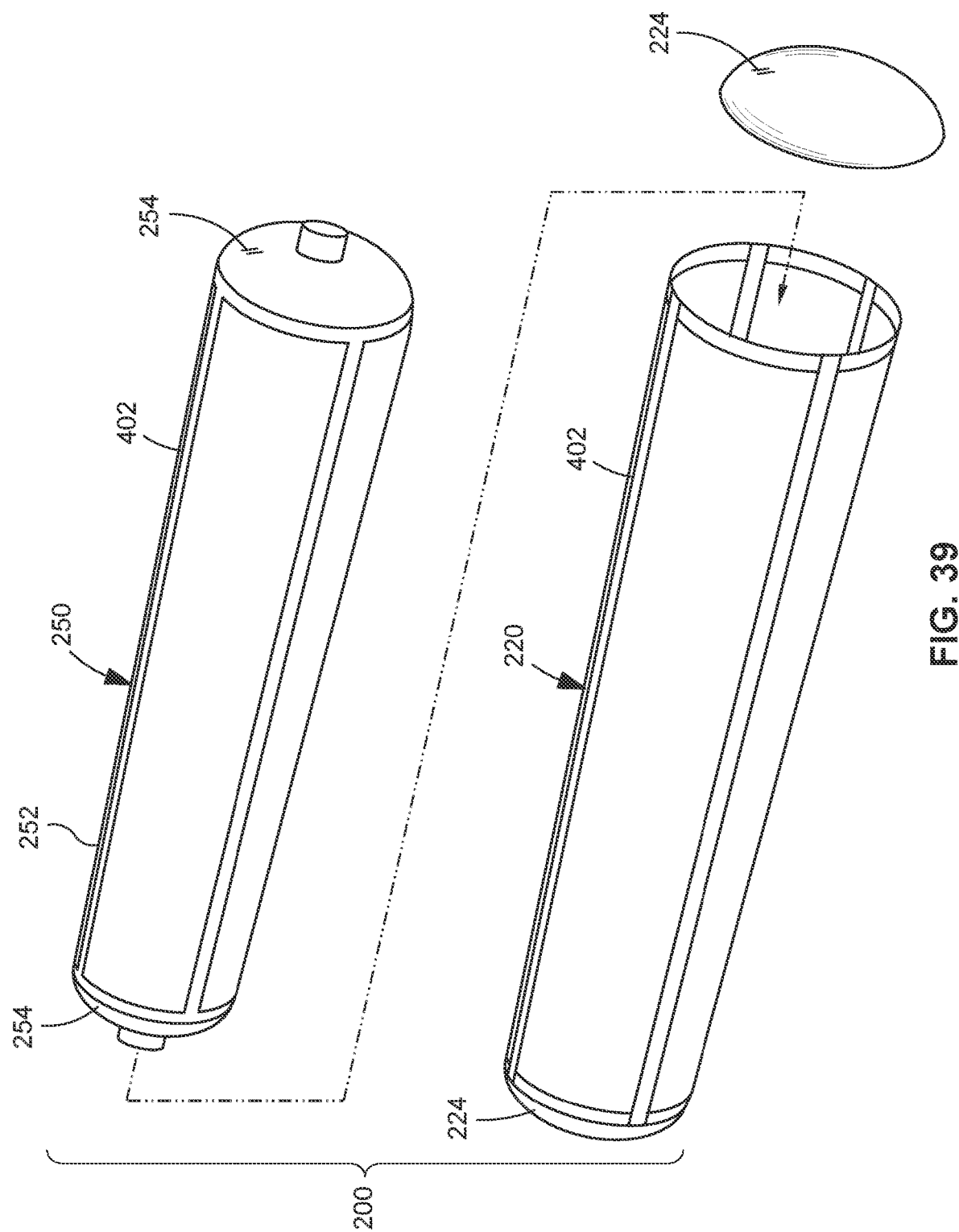
FIG. 39 is an exploded view of the tank system in an example in which the pressure tank skin segments and the vacuum tank skin have a straight cross section and a tapered cylindrical shape.

In the example of FIGS. 2-6, the vacuum tank main portion 222 has a straight cylindrical shape 400 (FIG. 3). However, in other examples, the vacuum tank main portion 222 can have a tapered cylindrical shape 402 as shown in FIG. 39 and described below. In FIGS. 2-6, the vacuum tank end portions 224 are shown having a hemispherical or semi-ellipsoid shape. However, in other examples not shown, the vacuum tank end portions 224 can be planar or flat, or the vacuum tank end portions 224 can have an inverted hemispherical or semi-ellipsoid shape, or any one of a variety of other shapes.

The pressure tank 250 is shaped complementary to the vacuum tank 220 to maximize volumetric efficiency for storing cryogenic fluid. The pressure tank 250 of FIGS. 2-6 has a pressure tank main portion 252 (FIG. 4) having a straight cylindrical shape 400 which extends between the pressure tank end portions 254. However, in other examples, the pressure tank main portion 252 can have a tapered cylindrical shape 402 as shown in FIG. 39 and described below. The pressure tank end portions 254 are shown having a hemispherical or semi-ellipsoid shape. However, the pressure tank end portions 254 can be planar or flat, or the pressure tank end portions 254 can have an inverted hemispherical or semi-ellipsoid shape, or other shape.

The pressure tank main portion 252 is comprised of one or more pressure tank skin segments 258 (FIG. 5). Each pressure tank skin segment 258 has a pair of skin segment longitudinal edges 270 (FIG. 7) respectively on opposite sides of the pressure tank skin segment 258. In addition, each pressure tank skin segment 258 has a pair of skin segment radial edges 278 (FIGS. 14-15) respectively on opposite ends of the pressure tank skin segment 258. The one or more pressure tank skin segments 258 that make up the pressure tank main portion 252 have a total circumference that is less than that of a complete circle, resulting in one or more longitudinal gaps 274 (FIG. 7) respectively between the skin segment longitudinal edges 270 of the one or more pressure tank skin segments 258.

The pressure tank 250 is preferably formed of a material capable of withstanding the extremely low temperatures required for storing cryogenic fluid. For example, the material of the pressure tank 250 has suitable mechanical properties at temperatures as low as 110.93 K (Kelvin) (−162 degrees Celsius; −260 degrees Fahrenheit.) for storing LNG, or as low as 20.28 Kelvin (−253 degrees Celsius; −423 degrees Fahrenheit.) for storing liquid hydrogen. In one example, the pressure tank 250 and/or the vacuum tank 220 can be formed of a metallic material such as steel, stainless steel, aluminum, titanium, copper, or other metallic materials or alloys thereof. Alternatively or additionally, the pressure tank 250 and/or the vacuum tank 220 can be formed of a suitable fiber-reinforced polymer matrix material (i.e., composite material) such as carbon fiber reinforced polymer (CFRP). The pressure tank 250 and the vacuum tank 220 may be formed of the same materials or of different materials.

In the example of FIGS. 2-6, the vacuum tank 220 is shown having vacuum tank skin stiffeners 234 coupled to the vacuum tank skin 226. The vacuum tank skin stiffeners 234 are located at spaced intervals around the circumference. The vacuum tank skin stiffeners 234 extend along the length of the vacuum tank main portion 222, and increase the axial stiffness of the vacuum tank skin 226 in the longitudinal or lengthwise direction. For examples where the tank system 200 is structurally integrated into an aircraft fuselage 102 such as one of the fuselage barrel sections 104 (e.g., FIG. 1), the axial stiffness of the vacuum tank skin stiffeners 234 enables the fuselage 102 to carry fuselage bending moments. In the example shown, the vacuum tank skin stiffeners 234 are located on the external side of the vacuum tank skin 226. However, the vacuum tank skin stiffeners 234 may be located on the internal side, or on both the internal side and the external side of the vacuum tank skin 226. In still further examples, the vacuum tank skin stiffeners 234 can be omitted from the vacuum tank 220, as shown in the examples of FIG. 39. However, a vacuum tank lacking vacuum tank skin stiffeners 234 would require a relatively thick vacuum tank skin 226 compared to the vacuum tank skin 226 of the stiffened version of the vacuum tank shown in FIGS. 2-6. In this regard, a vacuum tank (e.g., FIGS. 39-40) lacking vacuum tank skin stiffeners 234 may be more appropriate for ground-based applications (e.g., trains, automobiles, buses, trucks, power plants) for which weight is not as important as it is for aircraft 100.

Referring to FIG. 5, shown is a sectional view of a tank system 200 illustrating the pressure tank 250 under internal pressure 204. In the example shown, the pressure tank 250 is comprised of 4 pressure tank skin segments 258, resulting in 4 longitudinal gaps 274, each of which extends along the length of the pressure tank main portion 252 (FIG. 4). However, in other examples described below, the pressure tank 250 can include a different quantity of pressure tank skin segments 258. For example, the pressure tank 250 can include a single pressure tank skin segment 258 as shown in FIG. 33 described below, or the pressure tank 250 can include 2 pressure tank skin segments 258 as shown in FIG. 31 described below, or the pressure tank 250 can include 3 pressure tank skin segments 258 (not shown).

Figure 33:
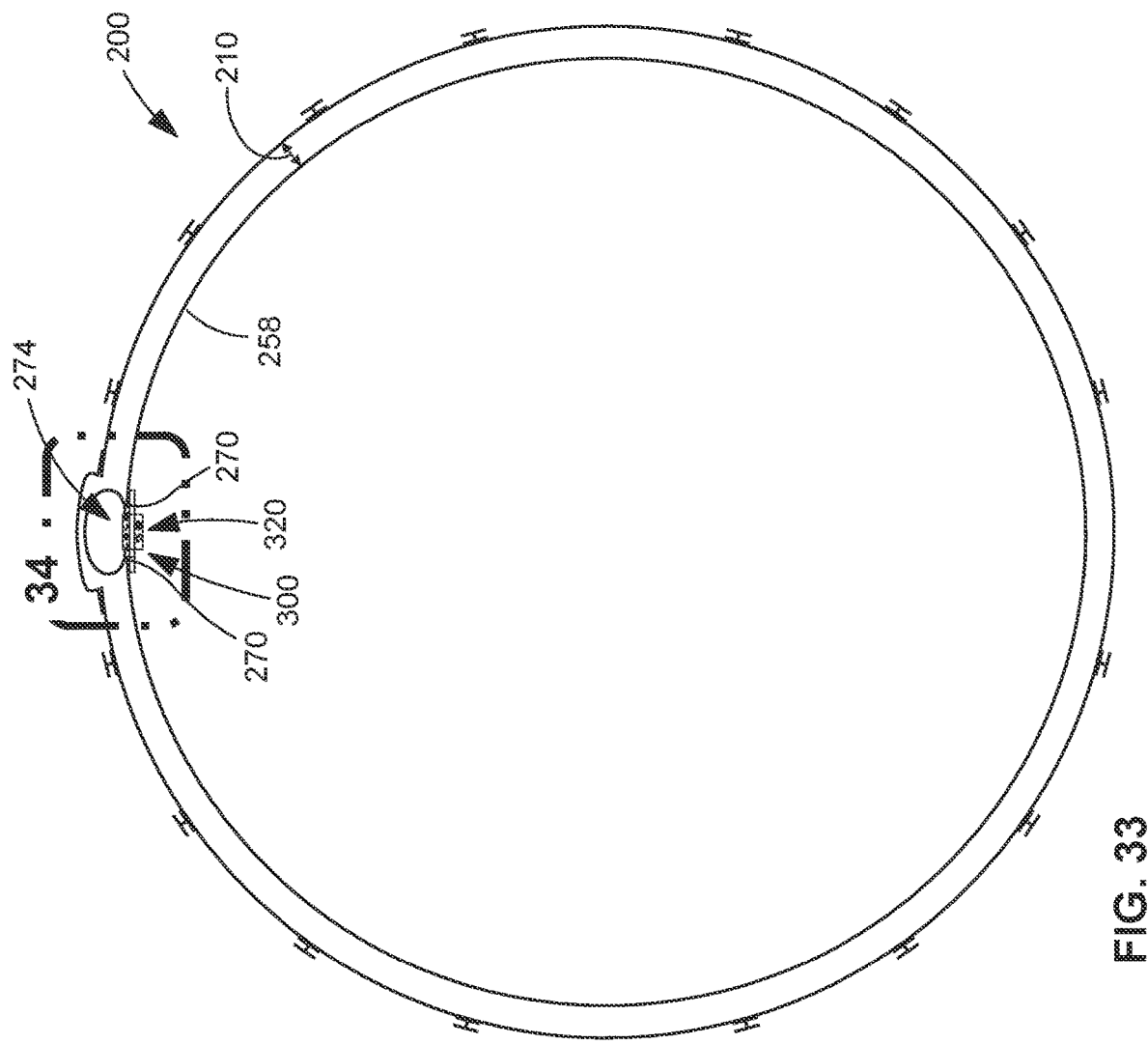
FIG. 33 is an axial sectional view of the tank system showing a further example of the gap control mechanism comprising a single outer mechanism interconnecting the opposing skin segment longitudinal edges of a single pressure tank skin segment

In each tank system 200 of FIGS. 5, 31, and 33, the pressure tank skin segments 258 are shown having the same arc length, and the longitudinal gaps 274 have the same width and angular spacing. However, in other examples not shown, the pressure tank 250 can be provided in an arrangement in which the pressure tank skin segments 258 have different arc lengths, and/or the width and/or angular spacing of the longitudinal gaps 274 is different. In this regard, the pressure tank 250 can be provided in any one of a variety of arrangements as long as the sum of the arc lengths of the pressure tank skin segments 258 and the longitudinal gaps 274 equals 360 degrees.

Figure 11:
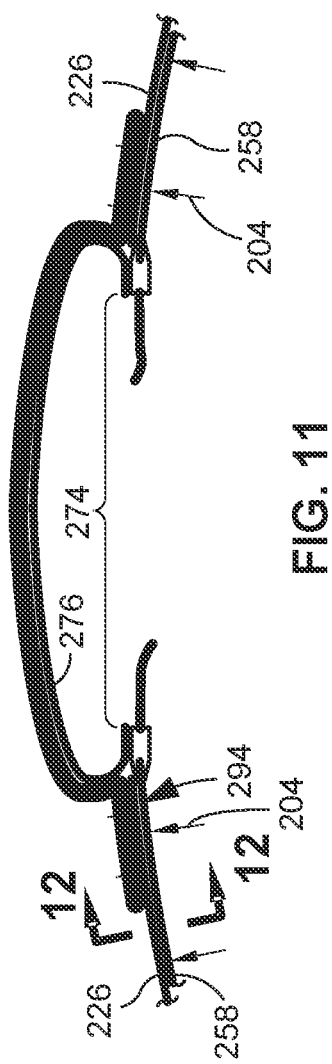
FIG. 11 shows the pressure tank skin segments in a fully extended position in which each pressure tank skin segment has radially moved into direct contact with the vacuum tank skin, and further illustrating the longitudinal seal received within a longitudinal recess formed in the vacuum tank skin.

As shown in FIG. 5, the tank system 200 includes a plurality of gap control mechanisms 300 for controlling the width of the longitudinal gaps 274, and thereby provide a means for adjusting the circumference of the pressure tank 250 for controlling the size of the radial gap 210 between the pressure tank skin segments 258 and the vacuum tank skin 226. In this regard, the gap control mechanisms 300 facilitate movement of the pressure tank skin segments 258 at least between a retracted position 290 as shown in FIG. 7, and a fully extended position 294 as shown in FIG. 11 and described below. The gap control mechanisms 300 are operable in a coordinated manner to facilitate simultaneous movement of the pressure tank skin segments 258 between the retracted position 290 and the fully extended position 294.

In the retracted position 290 (e.g., FIGS. 5 and 7), there is a radial gap 210 (FIG. 8) between each pressure tank skin segment 258 and the vacuum tank skin 226. The size of the radial gap 210 is such that the pressure tank 250 can be installed and removed from the vacuum tank 220 without interference between the two tanks 220, 250, thereby facilitating assembly or disassembly of the tank system 200, and providing easy access to the pressure tank 250 for inspection, maintenance, repair, and/or replacement without requiring disassembly of the vacuum tank 220. In other examples, such as during normal operating conditions (e.g., normal flight conditions of an aircraft 100), the gap control mechanisms 300 can place the pressure tank skin segments 258 in a partially extended position 292 (FIGS. 27-28) in which the radial gap 210 is relatively small to thereby maximize the volumetric efficiency of the pressure tank 250 for storing cryogenic fluid, while still providing a vacuum cavity 208 (FIG. 5) that thermally insulates the pressure tank 250 from the relatively warm ambient air 206 surrounding the vacuum tank 220.

When the pressure tank skin segments 258 are moved into the fully extended position 294 (e.g., FIG. 11), each pressure tank skin segment 258 is in direct physical contact with the vacuum tank skin 226. Because the skin segment outer surface 260 (FIG. 8) of each pressure tank skin segment 258 is complementary to (e.g., identical in size and shape) the vacuum tank inner surface 228 (FIG. 8) of the vacuum tank skin 226, the vacuum cavity 208 is eliminated, thereby preventing warm ambient air 206 surrounding the vacuum tank 220 from rushing into the vacuum cavity 208, which would otherwise occur in the event of a rupture in the vacuum tank 220. As mentioned above, if warm air were to contact the surfaces of the very cold pressure tank 250, the air would liquefy, which would result in a volatile mixture of liquid air and cryogenic fluid (e.g., liquid hydrogen or LNG) from the pressure tank 250 if also breached. Advantageously, by moving the pressure tank skin segments 258 into direct contact with the vacuum tank skin 226, the vacuum cavity 208 is eliminated, and the ability for the volatile mixture to form is prevented.

Referring to FIGS. 7-12, shown is an example of a gap control mechanism 300 comprising a skin segment coupler 302 and a coupler adjustment device 308. Each skin segment coupler 302 extends across the longitudinal gap 274 and interconnects the opposing pair of skin segment longitudinal edges 270 that define the longitudinal gap 274. The skin segment couplers 302 and associated coupler adjustment devices 308 provide a means for controlling the width of the longitudinal gaps 274 to thereby adjust the circumference of the pressure tank 250 for controlling the size of the radial gap 210 between the pressure tank skin segments 258 and the vacuum tank skin 226.

The tank system 200 further includes a longitudinal gap seal 276 extending continuously along the length of each longitudinal gap 274. Each longitudinal gap seal 276 is configured to seal the longitudinal gap 274 and thereby maintain a pressure barrier between the interior of the pressure tank 250 and the vacuum cavity 208. Opposite sides of each longitudinal gap seal 276 are attached respectively to the skin segment longitudinal edges 270 using adhesive and/or other suitable attachment mechanism. The longitudinal gap seals 276 can be formed of a flexible material and/or an elastomeric material such as rubber, silicone, metallic foil, or other suitable metallic and/or a polymeric material. In the example shown, the longitudinal gap seal 276 has a generally circular or bulbous cross-sectional shape configured to accommodate variations in width of the longitudinal gap 274 caused by movement of the pressure tank skin segments 258 between the retracted position 290 (FIG. 7) and the fully extended position 294 (FIG. 11). In some examples, the longitudinal gap seal 276 can be configured to expand and/or stretch to accommodate changes in the width of the longitudinal gap 274.

The vacuum tank skin 226 includes a longitudinal recess 236 extending along a lengthwise direction of the vacuum tank main portion 222. The longitudinal recess 236 has a cross-sectional shape that is sized to receive the longitudinal gap seal 276 when the pressure tank skin segments 258 are in the fully extended position 294. In an alternative arrangement, the longitudinal recess 236 may be formed in the above-mentioned outer tank housing (not shown) optionally enclosing the vacuum tank 220.

Referring to FIGS. 2-3 and 13-15, as mentioned above, the pressure tank 250 has opposing pressure tank end portions 254, and each pressure tank end portion 254 has an end portion radial edge 256 (FIG. 15) proximate one end of the pressure tank main portion 252. Each pressure tank skin segment 258 has skin segment radial edges 278 respectively on opposite ends of the pressure tank skin segment 258. Each skin segment radial edge 278 is separated from an adjacent end portion radial edge 256 by an end gap 280, which allows the pressure tank skin segments 258 to move from the retracted position 290 (FIG. 14) to the fully extended position 294 (FIG. 15).

Each end of the pressure tank 250 has an end gap seal 282 extending circumferentially around the end gap 280 (FIG. 13). The end gap seals 282 at the ends of the pressure tank 250 can be integral with the longitudinal gap seals 276 to provide a continuous pressure barrier for sealing the pressure tank 250. The end gap seals 282 can be configured similar to the above-described arrangement of the longitudinal gap seals 276, acting as flexible pressure membranes and allowing the one or more pressure tank skin segments 258 to move between the retracted position 290 and the fully extended position 294 while the pressure tank 250 contains cryogenic fluid under internal pressure 204.

As shown in FIGS. 13-15, each end of the vacuum tank skin 226 includes an end recess 238 extending circumferentially around the juncture of the vacuum tank main portion 222 and the vacuum tank end portion 224. The end recesses 238 and the longitudinal recesses 236 can be integral with the vacuum tank skin 226. In an alternative arrangement, each end recess 238 can be formed in the above-mentioned outer tank housing (not shown) optionally enclosing the vacuum tank 220. As shown in FIGS. 14-15, each end gap seal 282 is received within an end recess 238 as the pressure tank skin segments 258 move from the retracted position 290 to the fully extended position 294. The end recess 238 has a cross-sectional shape that is sized to receive the end gap seal 282 when the pressure tank skin segments 258 are in the fully extended position 294.

In any the examples disclosed herein, the gap control mechanisms 300 are configured to adjust the width of the longitudinal gaps 274 in the one or more pressure tank skin segments 258 to thereby adjust the radial gap 210 between the pressure tank 250 and the vacuum tank 220. The gap control mechanisms 300 can be activated or operated in a coordinated manner to simultaneously adjust the length of all of the skin segment couplers 302 at each longitudinal gap 274 upon the occurrence of an emergency condition or accident event. An emergency condition can include any condition where there is a high probability that the vacuum tank 220 may be breached or ruptured to an extent causing ambient air 206 to rush into the vacuum cavity 208. In the example of a vehicle such as aircraft 100, the emergency condition can include a declared emergency landing or a high probability of a forced landing or crash landing the aircraft 100.

The emergency condition can also include a condition or situation where the aircraft 100 experiences high acceleration levels above a predetermined threshold, and/or a condition or situation where projectiles such as bullets, missiles or other objects are being fired in the general direction of the aircraft 100. The emergency condition can be autonomously recognized by a processor such as a flight control computer (not shown) acting on signals received from one or more sensors (not shown) such as accelerometers mounted on the aircraft 100 and/or on the tank system 200. The processor can autonomously activate the coupler adjustment devices 308 upon recognizing an emergency condition. Alternatively or additionally, the coupler adjustment devices 308 may be manually activated if an emergency condition or situation is anticipated or perceived by an operator of a vehicle containing the tank system 200. For example, the emergency condition can include a situation where a pilot of an aircraft 100 anticipates that an emergency landing is imminent, and that there is a high probability that the vacuum tank 220 and/or the pressure tank 250 will rupture during the emergency landing.

Referring back to FIGS. 7-12, shown is an example of skin segment coupler 302 configured as a wire or cable 304 extending across the longitudinal gap 274. However, the skin segment couplers 302 can be provided in any one of a variety of alternative configurations including, but not limited to, bands, straps, bolts, turnbuckles, or any one of a variety of other configurations. In FIG. 7, the skin segment coupler 302 is in tension due to the internal pressure 204 exerted on the pressure tank skin segments 258 as a result of pressurization of the cryogenic fluid. As shown in FIGS. 7-8, the skin segment couplers 302 are of a length that holds the pressure tank skin segments 258 in the retracted position 290 for maintaining a radial gap 210 between the pressure tank skin segments 258 and the vacuum tank skin 226. A plurality of skin segment couplers 302 and associated coupler adjustment devices 308 are preferably mounted at spaced locations along the length of each longitudinal gap 274.

In the example of FIGS. 7-12, the coupler adjustment device 308 is a cable cutter 310. In the example shown, the cable cutter 310 has a spring 312 for actuating a cutting blade 314 for severing the wire or cable 304. FIG. 9 shows the cable cutter 310 supported on the cable 304, and the cutting blade 314 and spring 312 are in the retracted position 290. FIG. 10 shows the spring 312 forcing the cutting blade 314 into the cable 304, thereby severing the cable 304 into 2 cable portions 306 which remain with the respective pressure tank skin segments 258. The cable cutter 310 can be activated by an electrical solenoid (not shown) upon command by a processor or a person after an emergency condition has been determined. Although not shown, each cable cutter 310 can be tethered to one of the pressure tank skin segments 258 to reduce or avoid the possibility of a spark being generated by the cable cutters 310 striking the pressure tank 250 after the cable 304 has been severed.

Figure 12:
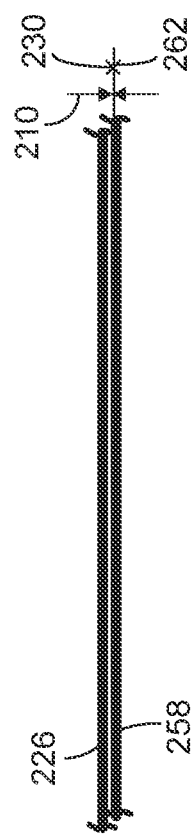
FIG. 12 is a longitudinal sectional view taken along line 12-12 of FIG. 11, and illustrating the pressure tank skin segment in contact with the vacuum tank skin.

FIGS. 11-12 shows the pressure tank skin segments 258 in the fully extended position 294 after the simultaneous severing of the skin segment couplers 302 (e.g., wires or cables 304) along each longitudinal gap 274. The internal pressure 204 within the pressure tank 250 provides the force that moves the pressure tank skin segments 258 from the retracted position 290 to the fully extended position 294 against the vacuum tank skin 226. The matching shapes (e.g., matching diameters) of the pressure tank skin segments 258 and the vacuum tank skin 226 allows the pressure tank skin segments 258 to be in direct physical contact with the vacuum tank skin 226, thereby eliminating the radial gap 210 and the associated vacuum cavity 208. Because there is no vacuum cavity 208, the forming of a mixture of liquid air and cryogenic fluid (e.g., liquid hydrogen or LNG) is prevented.

Figure 16:
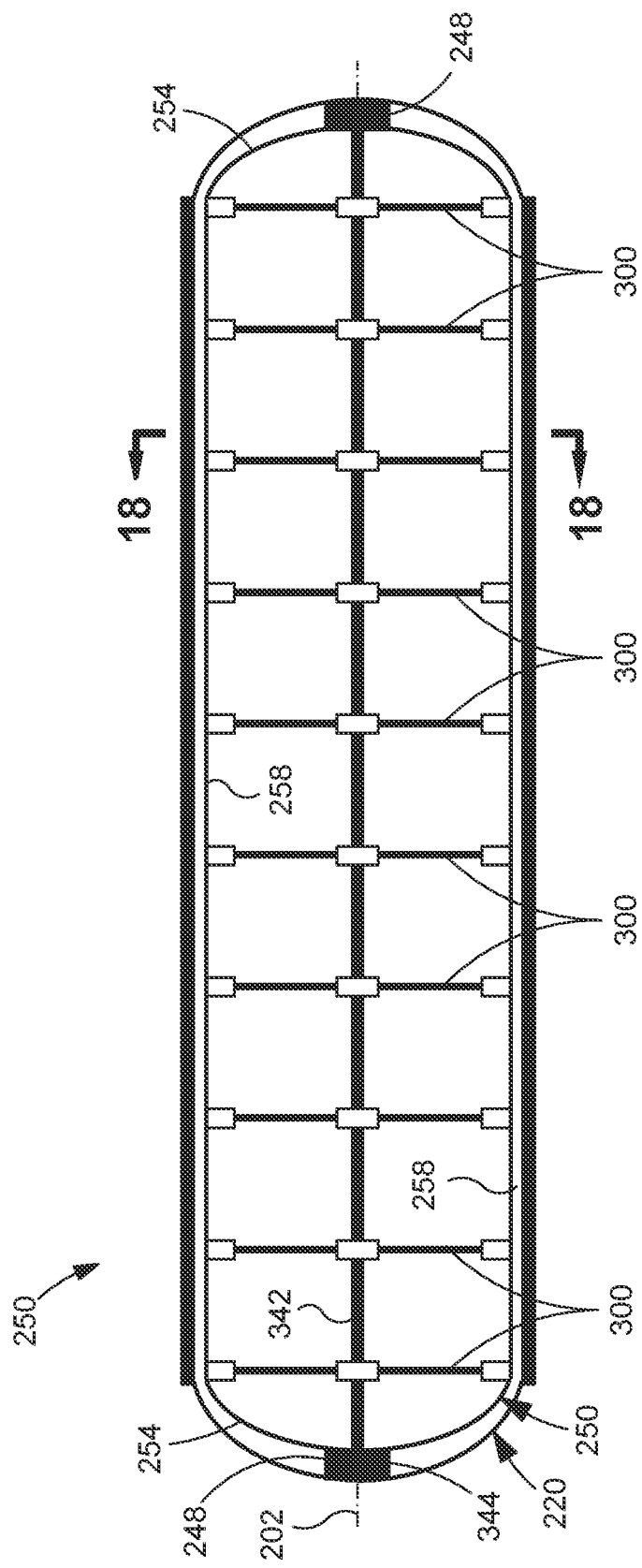
FIG. 16 is a longitudinal sectional view of the tank system showing a plurality of gap control mechanisms in an alternative configuration.
Figure 17:
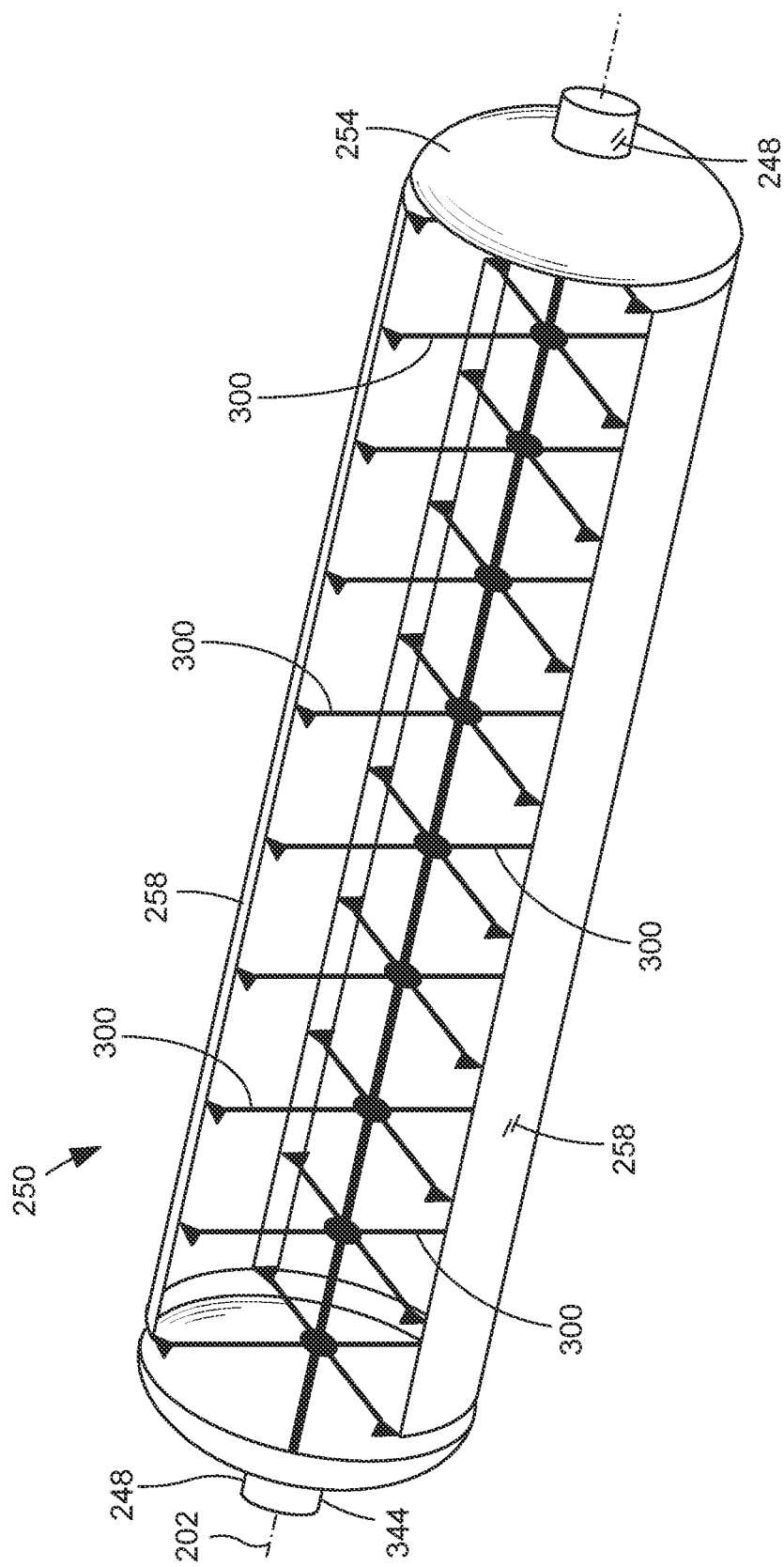
FIG. 17 is a perspective view of the tank system of FIG. 16 with one of the pressure tank skin segments removed.

Referring now to FIGS. 16-29, shown is a tank system 200 in which the pressure tank uses an alternative configuration of a gap control mechanism 300 for controlling the width of the longitudinal gaps 274 to thereby control the size of the radial gap 210 between the pressure tank skin segments 258 and the vacuum tank skin 226. FIG. 16 is a sectional view of the tank system 200 showing a plurality of the gap control mechanisms 300 located at spaced intervals along the length of the tank system 200. FIG. 17 is a perspective view of the tank system 200 in which 1 of the 4 pressure tank skin segments 258 has been removed to show the gap control mechanisms 300 inside the pressure tank 250.

Figure 18:
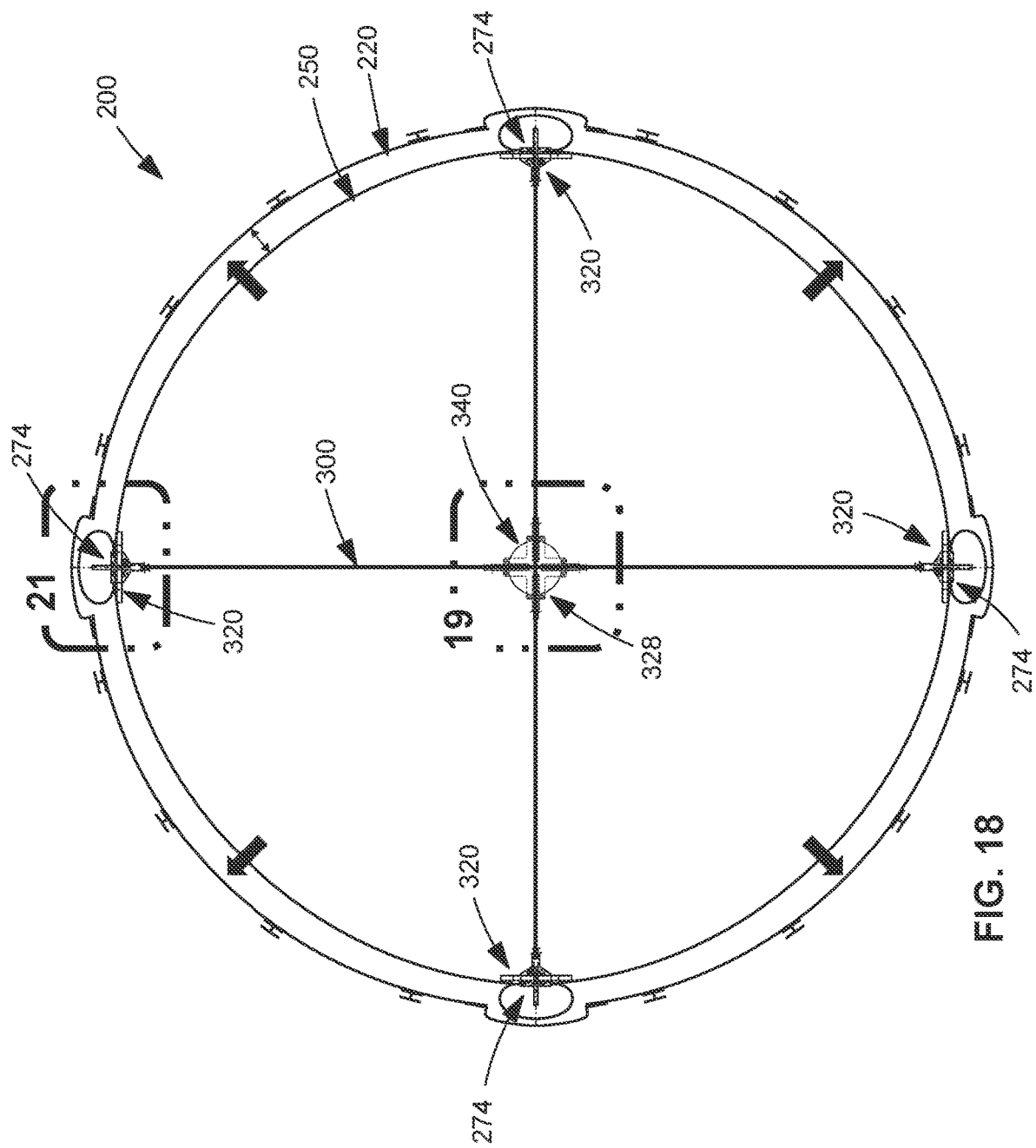
FIG. 18 is an axial sectional view of the tank system of FIGS. 16-17 taken along line 18-18, and illustrating an example of the gap control mechanism having a center mechanism and a plurality of outer mechanisms located respectively at the plurality of longitudinal gaps between the pressure tank skin segments.

FIG. 18 is an axial sectional view of the tank system 200 showing one of the gap control mechanisms 300 of FIGS. 16-17. Each gap control mechanism 300 has a center mechanism 340 generally centered within the pressure tank 250. In addition, each gap control mechanism 300 has an outer mechanism 320 located at each of the longitudinal gaps 274.

Referring to FIGS. 16-22, shown is an example of the center mechanism 340, which is coupled to a drive assembly 328. In the example shown, the drive assembly 328 is a drive shaft 342 which extends along the tank axis 202 (e.g., the tank centerline). The drive shaft 342 extends between the opposing pressure tank end portions 254. The drive assembly 328 includes a drive motor 344 for rotating the drive shaft 342 upon command. The drive motor 344 may be mounted proximate to or contained within one of the tank attach fittings 248, or at any other suitable location.

Each center mechanism 340 includes a center gear 346 fixedly mounted on the drive shaft 342. In addition, each center mechanism 340 includes a center bracket 348 which is non-rotatably mounted on the drive shaft 342. The center bracket 348 supports a plurality of pinion gears 352 and a plurality of rollers 354. Each pinion gear 352 is engaged to or is meshed with the center gear 346. The center mechanism 340 includes one or more inner spines 322. The inner spines 322 are non-rotatably mounted on the drive shaft 342, and each inner spine 322 extends radially outwardly from the center mechanism 340 to one of the longitudinal gaps 274 (e.g., FIGS. 21-22).

The center mechanism 340 also includes one or more radial members 324 which are slidably mounted in a sleeve-like manner respectively on the one or more inner spines 322. Each radial member 324 has a rack gear 350 (i.e., gear teeth) on one side of the radial member 324. The rack gear 350 of each radial member 324 is engaged to or meshed with one of the pinion gears 352. Each radial member 324 is captured between a roller 354 located on one side of the radial member 324, and a pinion gear 352 on an opposite side of the radial member 324. Rotation of the center gear 346 via the drive shaft 342 causes simultaneous rotation of the pinion gears 352, which causes simultaneous sliding translation of the radial members 324 along the inner spines 322.

Figure 21:
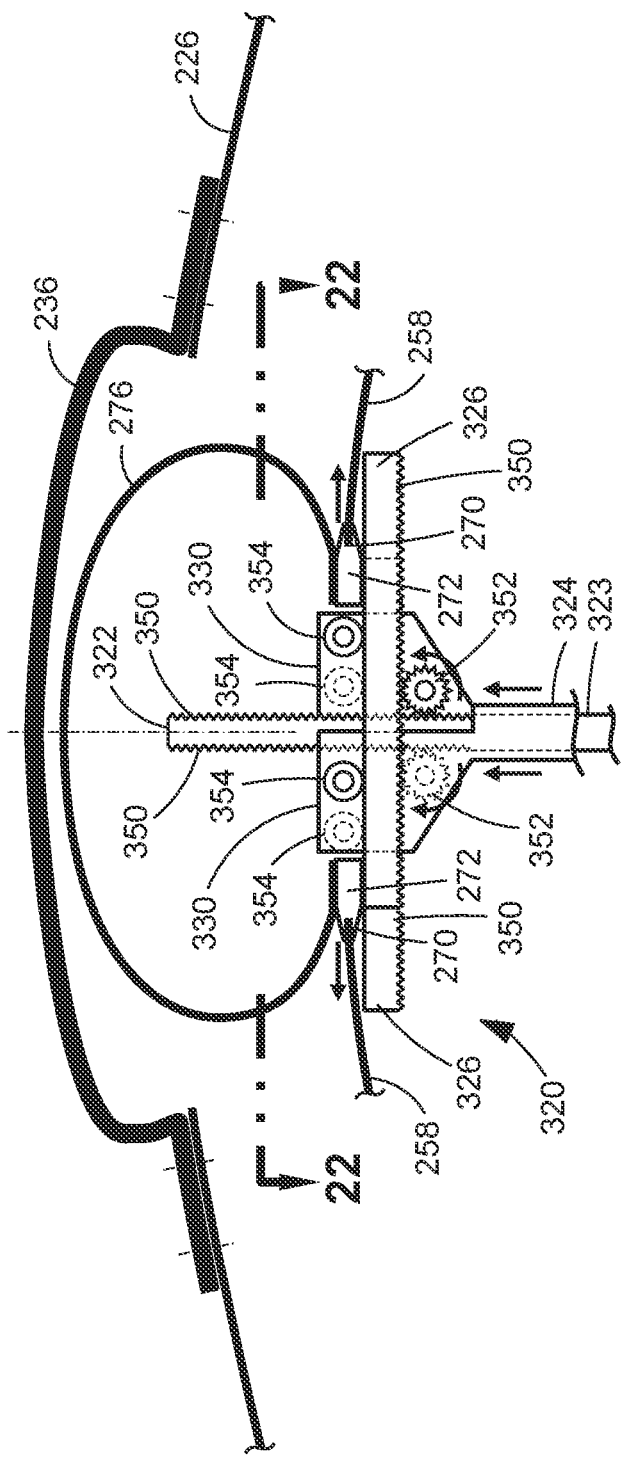
FIG. 21 is a magnified view of the outer mechanism identified by reference numeral 21 of FIG. 18, and illustrating the radial member supporting a pair of pinion gears which are engaged to the inner spine and to a pair of longitudinal edge drive plates respectively coupled to a pair of skin segment longitudinal edges located on opposite sides of the longitudinal gap.
Figure 22:
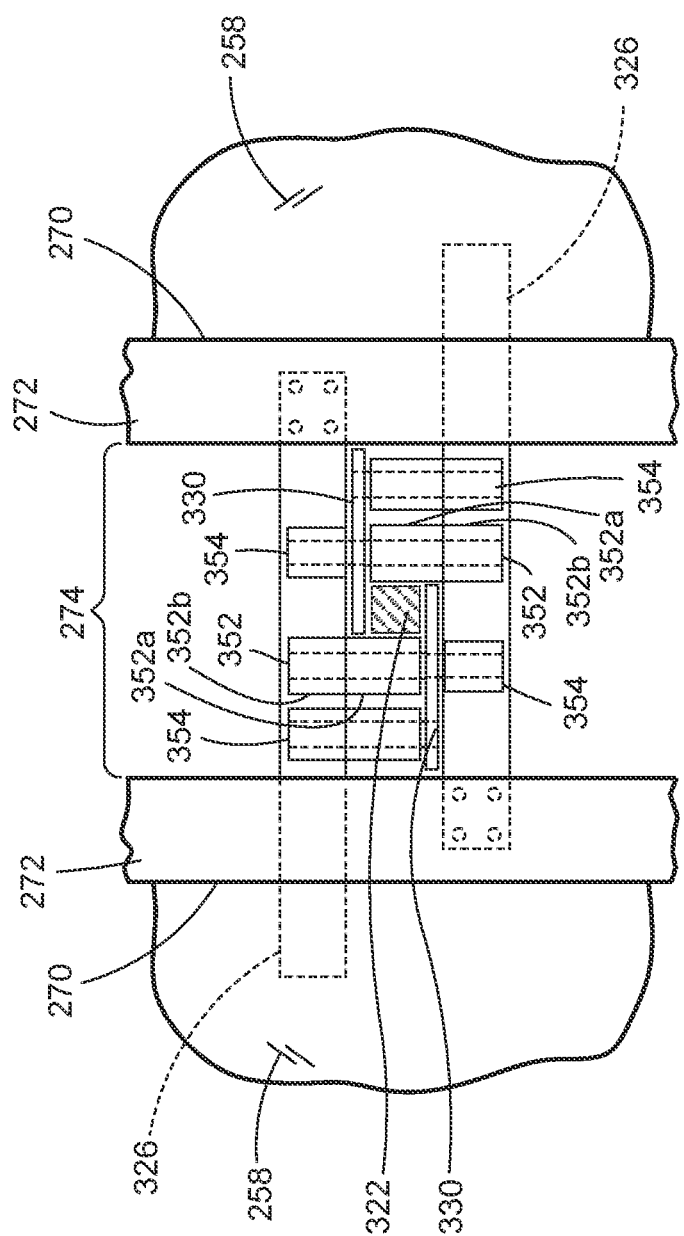
FIG. 22 is a top view of the outer mechanism of FIG. 21.
Figure 24:
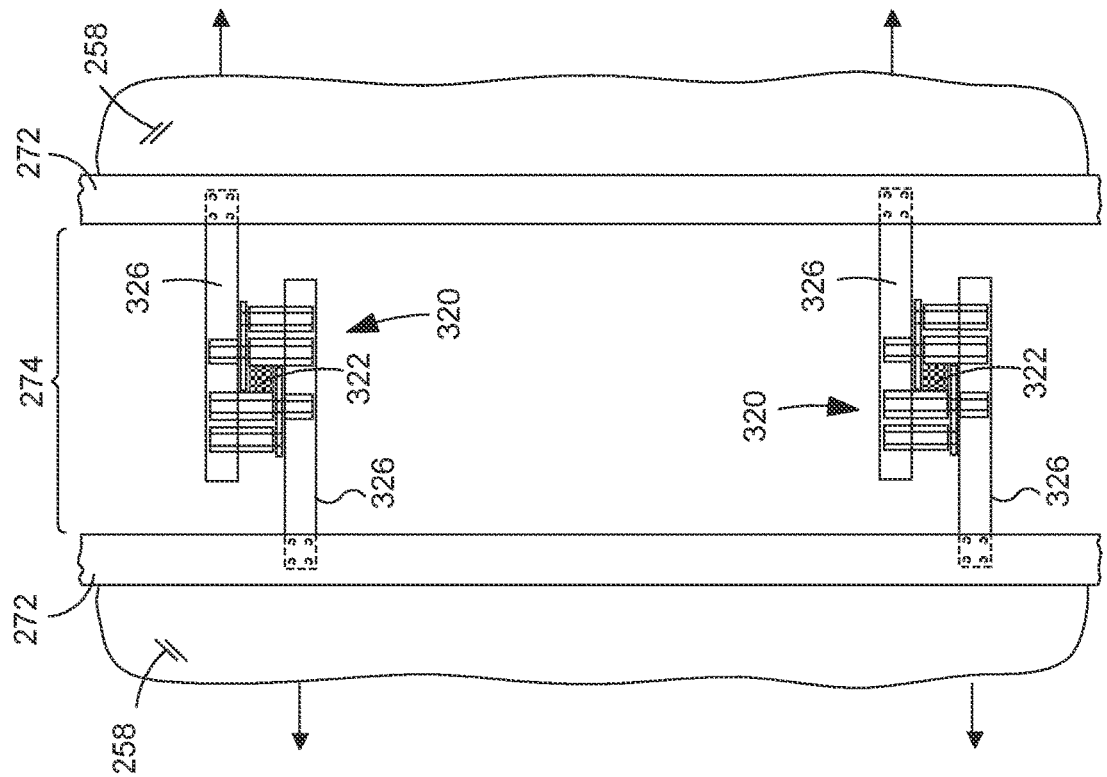
FIG. 24 shows the outer mechanisms of FIG. 23 after moving the pressure tank skin segments to the fully extended position.
Figure 23:
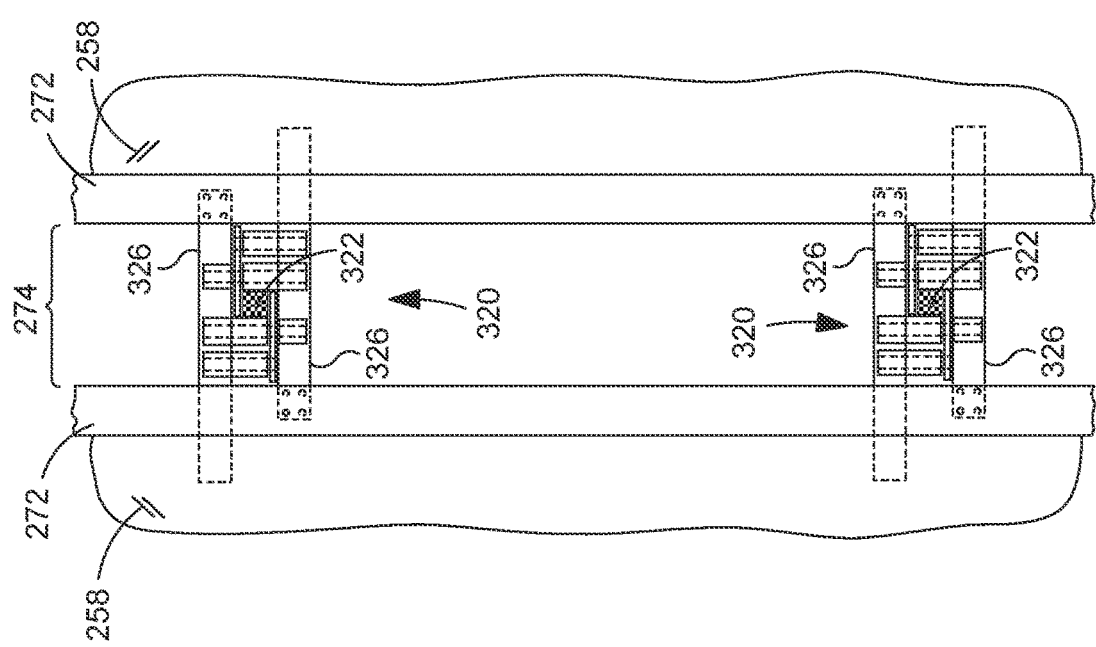
FIG. 23 is a top view of a pair of outer mechanisms operatively coupled to the pressure tank skin segments shown in the retracted position.

Referring to FIGS. 21-24, shown is an example of the outer mechanism 320, illustrating the above-mentioned inner spine 322 and radial member 324, both of which extend from the center mechanism 340 to the longitudinal gap 274. FIG. 22 is a top view of the outer mechanism 320 showing a pair of skin segment longitudinal edges 270 on opposite sides of the longitudinal gap 274. The outermost portion of the inner spine 322 has a rack gear 350 (i.e., gear teeth) on opposing sides of the inner spine 322, as shown in FIG. 21. The outer mechanism 320 includes a pair of outer brackets 330 which are integral with the radial member 324. A pinion gear 352 and a pair of rollers 354 are mounted on each outer bracket 330. The pinion gear 352 and rollers 354 of one outer bracket 330 face in a direction opposite the direction of the pinion gear 352 and rollers 354 of the other outer bracket 330. The pinion gear 352 of one outer bracket 330 is engaged to or meshed with the rack gear 350 on one side of the inner spine 322, and the pinion gear 352 of the other outer bracket 330 is engaged to or meshed with the rack gear 350 on the opposite side of the inner spine 322.

Each outer mechanism 320 includes a pair of longitudinal edge drive plates 326 located respectively on opposite sides of the radial member 324, as shown in FIG. 22. One of the longitudinal edge drive plates 326 is captured between the pinion gear 352 and pair of rollers 354 of one of the outer brackets 330, and the other longitudinal edge drive plate 326 is captured between the pinion gear 352 and pair of rollers 354 of the other outer bracket 330. In the example shown, each longitudinal edge drive plate 326 has a rack gear 350 (i.e., gear teeth) on a bottom side of the longitudinal edge drive plate 326. The rack gear 350 of each longitudinal edge drive plate 326 is engaged to or meshed with the pinion gear 352 of one of the outer brackets 330. One of the longitudinal edge drive plates 326 is coupled to the skin segment longitudinal edge 270 defining one side of the longitudinal gap 274, and the other longitudinal edge drive plate 326 is coupled to the skin segment longitudinal edge 270 defining the opposite side of the longitudinal gap 274.

Referring to FIGS. 21-24, the above-described arrangement of the longitudinal edge drive plates 326 occurs at each location of the outer mechanism 320. The pressure tank 250 includes a skin segment edge stiffener 272 coupled to each skin segment longitudinal edge 270 to increase the out-of-plane bending stiffness of the pressure tank skin segment 258, and thereby maintain the shape of the pressure tank skin segment 258 between locations where the pressure tank skin segments 258 are attached to the longitudinal edge drive plates 326. Similar to the above-described arrangement of FIGS. 9 and 11, FIG. 21 shows a longitudinal gap seal 276 extending along the length of the longitudinal gap 274 for maintaining a pressure barrier between the interior of the pressure tank 250 and the vacuum cavity 208. The vacuum tank skin 226 includes the above-described longitudinal recess 236 for receiving the longitudinal gap seal 276.

Rotation of the center gear 346 via the drive shaft 342 (via the drive motor 344) causes rotation of the pinion gears 352 at the center mechanism 340, causing simultaneous translation of the radial members 324 respectively along the inner spines 322. As mentioned above, the outer brackets 330 at each outer mechanism 320 are integral with the radial member 324, such that translation of the radial member 324 and outer brackets 330 causes rotation of the pinion gears 352 at the outer mechanisms 320 due to their engagement with the rack gears 350 on opposite sides of the inner spine 322. Rotation of the pinion gears 352 causes the longitudinal edge drive plates 326 to move in opposite directions, causing the skin segment longitudinal edges 270 to move toward or away from each other, depending on the direction of rotation of the center gear 346. Movement of the skin segment longitudinal edges 270 toward or away from each other changes the width of the longitudinal gap 274, which changes the circumference of the pressure tank 250, and thereby changes the size of the radial gap 210 between the pressure tank skin segments 258 and the vacuum tank skin 226. As mentioned above, the center mechanisms 340 are mounted on a common drive shaft 342, such that rotation of the drive shaft 342 causes all the pressure tank skin segments 258 to move simultaneously by equal amounts.

Referring now to FIGS. 25-30, shown are the pressure tank skin segment 258 at three different positions. Also shown are the corresponding movements of the components of the center mechanism 340 and the outer mechanism 320 for moving the pressure tank skin segments 258.

FIGS. 25-26 show the pressure tank skin segments 258 in the retracted position 290. FIG. 26 is a longitudinal cross section of the pressure tank skin segment 258 and the vacuum tank skin 226 illustrating the size of the radial gap 210 with the pressure tank skin segment 258 in the retracted position 290. In the present disclosure, the radial gap 210 is measured between the pressure tank maximum diameter 262 of the skin segment outer surface 260, and the vacuum tank maximum diameter 230 of the vacuum tank inner surface 228. As mentioned above, when the pressure tank skin segments 258 are in the retracted position 290, the size of the radial gap 210 is large enough to allow for the installation and removal of the pressure tank 250 from the vacuum tank 220 without interference between the two tanks 220, 250.

FIGS. 27-28 show the pressure tank skin segments 258 in the partially extended position 292, which provides for a relatively small radial gap 210 between the skin segment outer surface 260 (i.e., the pressure tank maximum diameter 262) and the vacuum tank inner surface 228 (i.e., the vacuum tank maximum diameter 230). Also shown in FIG. 27 are arrows indicating the direction of rotation of the center gear 346 and the pinion gears 352, causing the longitudinal edge drive plates 326 to move away from each other, and thereby moving the skin segment longitudinal edges 270 away from each other. More specifically, rotation of the pinion gears 352 at the outer mechanisms 320 causes the skin segment longitudinal edges 270 to move in the lateral direction (e.g., the horizontal direction in FIG. 27) by an amount equal to their movement in the radial direction (e.g., the vertical direction in FIG. 27), resulting in each skin segment longitudinal edge 270 moving at a 45-degree angle relative to the radial direction of movement.

If a smaller or larger longitudinal gap 274 is desired than what is shown, the pinion gears 352 at each outer mechanism 330 can be configured to cause the skin segment longitudinal edges 270 to move at a different angle than the 45-degree-angled movement shown in FIGS. 25-30. For example, instead of each pinion gear 352 having the same radius at the gear-inner spine interface portion 352*a* as its radius at the gear-drive plate interface portion 352*b* as shown in FIG. 22, the pinion gears 352 could be replaced with a pinion gear (not shown) having a different radius at the gear-inner spine interface portion 352*a* than its radius at the gear-drive plate interface portion 352*b*. In FIG. 22, the gear-inner spine interface portion 352*a* of each pinion gear 352 is the portion that is engaged to the inner spine 322, and the gear-drive plate interface portion 352*b* is the portion that is engaged to a longitudinal edge drive plate 326.

In another example not shown, the tank system 200 can be provided in an arrangement wherein the pressure tank main portion 252 is comprised of 3 pressure tank skin segments 258, resulting in 3 spaced longitudinal gaps 274 respectively between the three pressure tank skin segments 258. A tank system 200 with 3 pressure tank skin segments 258 can be configured and operated similar to the above-described tank system 200 of FIG. 18. In this regard, the gap control mechanisms 300 of a tank system 200 having 3 pressure tank skin segments 258 can includes a center mechanism 340 and 3 outer mechanisms 320 located respectively at the 3 longitudinal gaps 274.

FIG. 28 shows the radial gap 210 when the pressure tank skin segments 258 are in the partially extended position 292. Under normal operating conditions, a nominal value for the radial gap 210 when the pressure tank skin segments 258 are in the partially extended position 292 may be approximately 1.0 inch. However, the radial gap 210 during normal operating conditions (e.g., normal flight conditions) may be larger or smaller than 1.0 inch. The size of the radial gap 210 may be dictated at least in part by the magnitude of structural deflections of the pressure tank 250 that can occur during normal operating conditions. The size of the radial gap 210 may be selected such that the pressure tank 250 will not contact the vacuum tank 220 regardless of the magnitude and/or direction of the loads that the tank system 200 is subjected to during normal operating conditions. Such structural deflections include deflections due to static loads from the structural mass of the pressure tank 250 plus the mass of the cryogenic fluid it contains. In the context of an aircraft 100, the magnitude of the structural deflections of the pressure tank 250 can be momentarily increased at different times during a flight due to gust loads, maneuvering loads, landing loads, or other loads.

The tank system 200, in some examples, may be configured to allow for real-time adjustment of the size of the radial gap 210 when the pressure tank skin segments 258 are in the partially extended position 292. For example, the tank system 200 can include sensors (not shown) for sensing the amount of angular rotation of the center gear 346. Feedback from the sensors can be received at a processor (e.g., a flight control computer) which can consult a lookup table to determine the size of the radial gap 210 that corresponds to the most recent angular rotation measurement. The radial gap 210 can be adjusted to a different size that is complementary to a specific condition that the aircraft 100 is subjected to. For example, when an aircraft 100 is taxiing, the radial gap 210 can be relatively small due to relatively small structural deflections of the pressure tank 250, such as structural deflections caused by the aircraft 100 rolling over small bumps in the taxiway. By minimizing the size of the radial gap 210 during taxi and prior to takeoff, the diameter of the pressure tank 250 can be relatively large, which allows the pressure tank 250 to be initially loaded with a larger quantity of cryogenic fluid (e.g., liquid hydrogen or LNG).

For other conditions during which relatively large structural deflections of the pressure tank 250 may occur, such as during turbulence currently detected during cruise flight or turbulence which is predicted to occur, the size of the radial gap 210 can be increased to prevent the pressure tank 250 from contacting the vacuum tank 220. The adjustment of the size of the radial gap 210 can be effectuated by commanding the drive motor 344 (FIG. 17) to rotate the drive shaft 342 to cause a predetermined amount of angular rotation of the center gears 346 to achieve the desired increase in the size of the radial gap 210. The tank system 200 can be configured such that the radial gap 210 can be manually adjusted, such as by a member of the flight crew (e.g., the pilot) briefly activating the drive motor 344. Alternatively or additionally, the tank system 200 can be configured such that the size of the radial gap 210 is autonomously adjusted, such as by a command generated by the flight control computer.

FIGS. 29-30 show the pressure tank skin segments 258 in the fully extended position 294 in which the pressure tank skin segments 258 are in contact with the vacuum tank skin 226, thereby eliminating the radial gap 210. In FIGS. 29-30, the size (e.g., diameter) of the skin segment outer surface 260 (FIG. 26) is identical to the size (e.g., diameter) of the vacuum tank inner surface 228 (FIG. 26). When the skin segment outer surfaces 260 are in the fully extended position 294, the pressure tank skin segments 258 are in direct contact with the vacuum tank inner surface 228, thereby eliminating the vacuum cavity 208 associated with the radial gap 210. By eliminating the vacuum cavity 208 (FIG. 28), warm ambient air 206 surrounding a ruptured vacuum tank 220 is prevented from contacting the surfaces of the very cold pressure tank 250, which would otherwise cause the air to liquefy, potentially resulting in a volatile mixture of liquid air and cryogenic fluid (e.g., liquid hydrogen or LNG) from the pressure tank 250 if also ruptured.

As described above, the pressure tank skin segments 258 can be moved to the fully extended position 294 upon the occurrence of an actual emergency condition, and/or when there is a high probability that an emergency condition will occur. The emergency condition can include any scenario where there is a high probability that the vacuum tank 220 will be breached or ruptured to an extent causing ambient air 206 to rush into the vacuum cavity 208. In the example of an aircraft 100, the pressure tank skin segments 258 can be moved to the fully extended position 294 where the aircraft 100 experiences high acceleration levels, and/or when projectiles such as bullets or missiles are being fired at the aircraft 100, and/or when the pilot of the aircraft 100 anticipates that a crash landing is imminent, or in any one of a variety of other scenarios where it is possible that the vacuum tank 220 will be breached or ruptured.

The tank system 200 in some examples may be configured to measure the magnitude of the compression force between the vacuum tank skin 226 and the pressure tank skin segments 258 when in the fully extended position 294. For example, the tank system 200 may include a torque sensor (not shown) attached to the drive motor 344 and configured measure torque on the drive shaft 342 or the center gear 346. Torque measurement sensed by the torque sensor can be received at a processor (e.g., flight control computer) which can then determine the magnitude of the compression force based on the torque measurements. The magnitude of the compression force can be increased by slightly rotating the center gear 346 via the drive motor 344 until achieving the desire magnitude of compression force. During an emergency condition, an increase in the magnitude of the compression force may reduce the probability that ambient air 206 can rush into any gaps that may otherwise occur between the pressure tank 250 and the vacuum tank 220 due to manufacturing tolerances or structural deflections.

Figure 32:
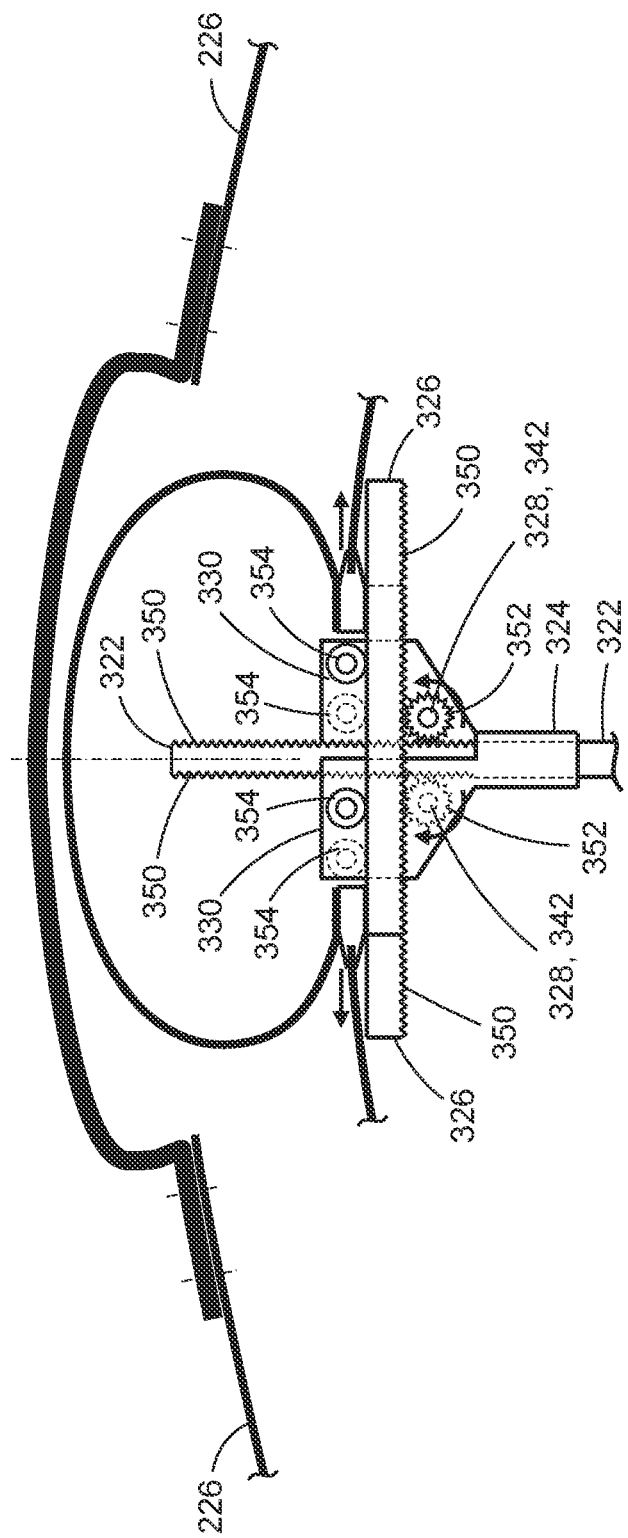
FIG. 32 is a magnified view of the outer mechanism identified by reference numeral 32 of FIG. 31.

Referring to FIGS. 31-32, shown in FIG. 31 is an example of a tank system 200 having 2 pressure tank skin segments 258 separated by 2 diametrically opposed longitudinal gaps 274. The tank system 200 can have a plurality of gap control mechanisms 300 located at spaced intervals along the length of the tank system 200, similar to the above-described arrangement of FIG. 16. Each gap control mechanism 300 is comprised of 2 outer mechanisms 320 respectively at the 2 longitudinal gaps 274. The center mechanism 340 is omitted from the gap control mechanism 300, which simplifies the arrangement and reduces the cost and weight of the tank system 200. Each gap control mechanism 300 includes an inner spine 322 extending diametrically from the longitudinal gap 274 on one side of the pressure tank 250 to the longitudinal gap 274 on the opposite side of the pressure tank 250.

As shown in FIG. 32, the outermost portion of the inner spine 322 has a rack gear 350 (i.e., gear teeth) on opposing sides of the inner spine 322, similar to the above-described arrangement of FIG. 21. The outer mechanism 320 includes a pair of outer brackets 330 which are integral with a radial member 324 which, unlike the radial member 324 of FIG. 18, has a relatively short length for sliding along the inner spine 322. A pinion gear 352 and a pair of rollers 354 are mounted on each outer bracket 330. Similar to the arrangement of FIGS. 21-22, the pinion gear 352 and rollers 354 of one outer bracket 330 face in a direction opposite the pinion gear 352 and rollers 354 of the other outer bracket 330. The pinion gear 352 of one outer bracket 330 is engaged to the rack gear 350 on one side of the inner spine 322, and the pinion gear 352 of the other outer bracket 330 is engaged to the rack gear 350 on the opposite side of the inner spine 322.

The outer mechanism 320 of FIG. 32 includes a pair of longitudinal edge drive plates 326 located respectively on opposite sides of the radial member 324, similar to the arrangement shown in FIG. 22. One of the longitudinal edge drive plates 326 is captured between the pinion gear 352 and pair of rollers 354 of one of the outer brackets 330, and the other longitudinal edge drive plate 326 is captured between the pinion gear 352 and pair of rollers 354 of the other outer bracket 330. Each longitudinal edge drive plate 326 has a rack gear 350 (i.e., gear teeth) on a bottom side of the longitudinal edge drive plate 326. The rack gear 350 of each longitudinal edge drive plate 326 is engaged to or meshed with the pinion gear 352 of one of the outer brackets 330.

The tank system 200 of FIGS. 31-32 includes at least one drive assembly 328 for rotating the pinion gears 352 for moving the radial member 324 along the inner spine 322 in a manner causing simultaneous movement of the longitudinal edge drive plates 326 in opposite directions. In the example shown, the drive assembly 328 comprises a drive shaft 342 extending through all of the pinion gears 352 mounted to the outer brackets 330 located on one side of the longitudinal gap 274, and another drive shaft 342 extending through all of the pinion gears 352 mounted to the outer brackets 330 located on an opposite side of the longitudinal gap 274.

Each drive shaft 342 can be driven by a dedicated drive motor 344 (not shown). Alternatively, each pinion gear 352 may be driven be a dedicated servo motor (not shown) mounted proximate the outer bracket 330 supporting the pinion gear 352. The drive shafts 342 of associated with each longitudinal gap 274 are rotated in a synchronized manner to rotate the pinion gears 352 for causing the skin segment longitudinal edges 270 at each longitudinal gap 274 to move in opposite directions, thereby adjusting the size of the radial gap 210 between the pressure tank skin segments 258 and the vacuum tank skin 226. The gap control mechanism 300 of FIGS. 31-32 can be operated in a manner to move the pressure tank skin segments 258 between a retracted position 290 (FIG. 26), a partially extended position 292 (FIG. 28), and a fully extended position 294 (FIG. 30), or to any other position between the retracted position 290 and the fully extended position 294. In this regard, any one or more of the above-described components and functionalities associated with the tank system 200 of FIGS. 21-29 are applicable to the tank system 200 of FIGS. 31-32.

Figure 34:
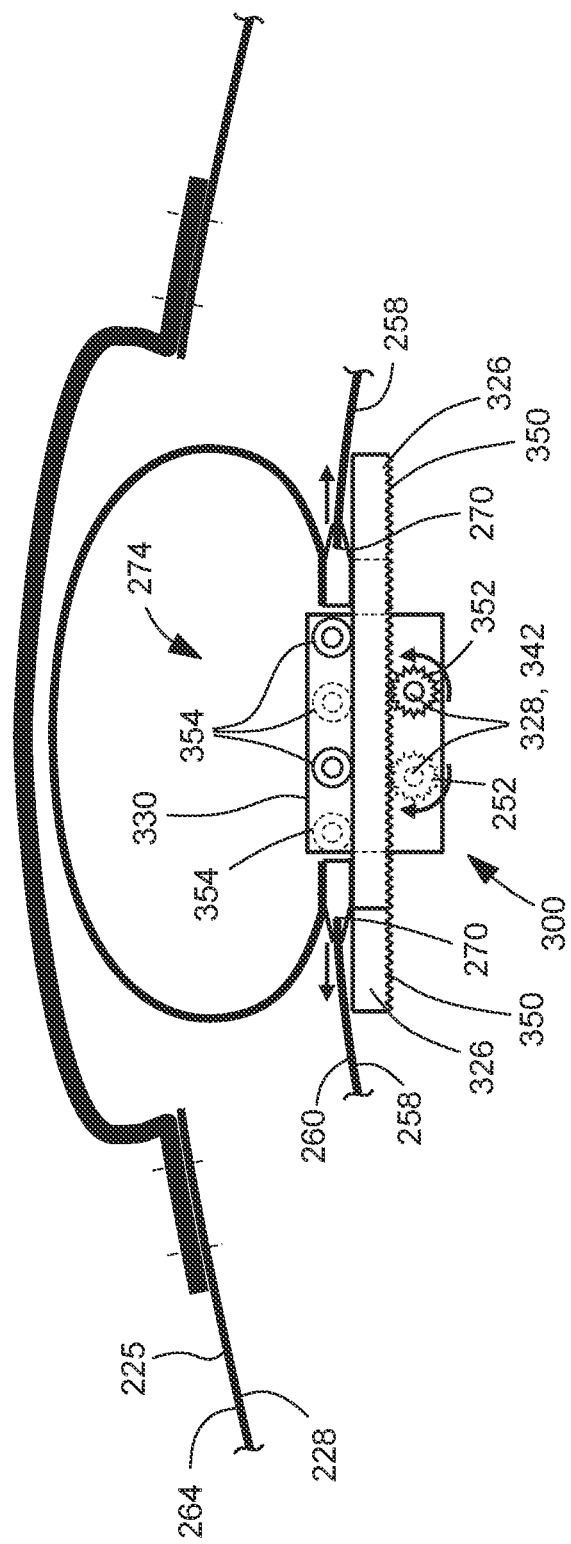
FIG. 34 is a magnified view of the outer mechanism identified by reference numeral 34 of FIG. 33.

In the example of FIG. 31-32, the gap control mechanisms 300 are configured to move the skin segment longitudinal edges 270 in the lateral direction (e.g., the horizontal direction in FIG. 32) by an amount equal to their movement in the radial direction (e.g., the vertical direction in FIG. 32), resulting in each skin segment longitudinal edge 270 moving at a 45-degree angle relative to the radial direction of movement, similar to the arrangement in FIGS. 25-30. However, in other examples not shown, the gap control mechanisms 300 can be configured to move the 2 pressure tank skin segments 258 of FIG. 31 in completely horizontal directions, which allows for a more simplified outer mechanism 320, an example of which is shown in FIG. 34 and described in greater detail below. If the movement of the 2 pressure tank skin segments 258 of FIG. 31 is completely horizontal, the shape and size of the pressure tank skin segments 258 (i.e., the skin segment outer surface 260) can be identical to the vacuum tank skin 226 (i.e., vacuum tank inner surface 228). However, the size of the radial gap 210 near the top and bottom of the tank system 200 will necessarily be smaller than the radial gap 210 on the sides of the tank system 200.

Referring to FIGS. 33-34, shown is an example of a tank system 200 having a single pressure tank skin segment 258 having a pair of skin segment longitudinal edges 270 separated a single longitudinal gap 274. Advantageously, a pressure tank 250 having a single pressure tank skin segment 258 simplifies the assembly and operation of the tank system 200 relative to tank systems 200 having multiple pressure tank skin segments 258 that must be activated in a coordinated manner. The tank system 200 of FIGS. 33-34 has a plurality of gap control mechanisms 300 located at spaced intervals along the length of the tank system 200, similar to the above-described arrangement of FIG. 16. Each gap control mechanism 300 comprises a single outer mechanism 320 located at the longitudinal gap 274. The outer mechanism 320 of FIG. 34 is configured similar the above-described arrangement of FIG. 32, except that the inner spine 322 and radial member 324 are omitted. The outer mechanism 320 includes an outer bracket 330. A pinion gear 352 and a pair of rollers 354 protrude from each of opposing sides of the outer bracket 330.

The outer mechanism 320 of FIG. 34 includes a pair of longitudinal edge drive plates 326 located respectively on opposite sides of the outer bracket 330. One of the longitudinal edge drive plates 326 is captured between the pinion gear 352 and pair of rollers 354 protruding from one side of the outer bracket 330, and the other longitudinal edge drive plate 326 is captured between the pinion gear 352 and pair of rollers 354 protruding from the opposite side of the outer bracket 330. Each longitudinal edge drive plate 326 has a rack gear 350 (i.e., gear teeth) on a bottom side of the longitudinal edge drive plate 326. The rack gear 350 of each longitudinal edge drive plate 326 is engaged to one of the pinion gears 352 protruding from the outer bracket 330.

The tank system 200 of FIGS. 33-34 includes at least one drive assembly 328 for rotating the pinion gears 352 for moving the longitudinal edge drive plates 326 in opposite directions. For example, the pinion gears 352 on one side of the longitudinal gap 274 can be driven by one drive shaft 342, and the pinion gears 352 on the opposite side of the longitudinal gap 274 can be driven by another drive shaft 342. Each drive shaft 342 may be driven by a dedicated drive motor 344, or each pinion gear 352 may be driven be a dedicated servo motor. The one or more drive assemblies 328 are operated in a coordinated manner to simultaneously rotate the pinion gears 352 in a manner causing the skin segment longitudinal edges 270 to move in opposite directions, for adjusting the size of the radial gap 210 between the pressure tank skin segment 258 and the vacuum tank skin 226, for moving the pressure tank skin segment 258 between the retracted position 290, the partially extended position 292, the fully extended position 294, or any position in between, similar to the operation described above with regard to the gap control mechanism 300 of FIGS. 21-29. In this regard, any one or more of the above-described components and functionalities associated with the tank system 200 of FIGS. 21-29 are applicable to the tank system 200 of FIGS. 33-34.

In FIGS. 33-34, as the circumference of the pressure tank skin segment 258 increases during radially outward movement, the skin segment outer surface 260 will come into contact with the vacuum tank inner surface 228. Because the movement of each point on the skin segment outer surface 260 is not perfectly radial, the skin segment outer surface 260 will slide along the vacuum tank inner surface 228. However, the skin segment outer surface 260 and the vacuum tank inner surface 228 can each be provided with a smooth surface finish to thereby reduce the sliding friction, and thereby providing freedom of sliding movement of the pressure tank skin segment 258 relative to the vacuum tank skin 226.

Referring now to FIGS. 35-38, shown is an example of the tank system 200 in which the vacuum tank 220 has a vacuum tank longitudinal joint 240 positioned on diametrically opposite sides of the vacuum tank main portion 222 (FIG. 13), and extending around the vacuum tank end portion 224 (FIG. 3) at each end of the vacuum tank 220. The vacuum tank longitudinal joint 240 facilitates the separation of the vacuum tank 220 into two tank halves to allow for installation and removal of the pressure tank 250 from the vacuum tank 220. As shown in FIG. 36, the vacuum tank longitudinal joint 240 can be comprised of opposing joint fittings 242 respectively on upper and lower sides of the vacuum tank longitudinal joint 240. The joint fittings 242 are mateable to each other, and can be interconnected by joint fasteners (not shown) located at spaced intervals along the length of the vacuum tank longitudinal joint 240.

As shown in FIGS. 37-38, the vacuum tank longitudinal joint 240 allows the vacuum tank 220 to be separated into 2 tank halves, including an upper tank half 244 and a lower tank half 246. FIG. 37 shows the lower tank half 246 being lowered away from the upper tank half 244, thereby exposing the pressure tank 250. FIG. 38 shows the pressure tank 250 lowered away from the upper tank half 244, which allows for inspection, maintenance, repair, and/or replacement of the pressure tank 250. Removal of the pressure tank 250 also provides access to the interior of the vacuum tank 220 for inspection, maintenance, repair, and/or replacement of one or more components of the tank system 200. Installation of the pressure tank 250 into the vacuum tank 220 is performed by reversing the above-described procedure for removal. Although FIGS. 35-38 illustrate a pressure tank 250 having a single pressure tank skin segment 258, the vacuum tank longitudinal joint 240 may be implemented in pressure tanks 250 having any number of pressure tank skin segments 258. For examples where the tank system 200 is integrated into an aircraft 100, the vacuum tank 220 may function as one of the fuselage barrel sections 104 as mentioned above. The fuselage barrel section 104 may be configured to allow the lower tank half 246 to be separated from the upper tank of the vacuum tank 220, to facilitate removal of the pressure tank 250 as shown in FIGS. 37-38.

Referring to FIG. 39, shown is an exploded view of an example of a tank system 200 in which the pressure tank 250 and the vacuum tank 220 each have a tapered cylindrical shape 402. The pressure tank skin segments 258 of the pressure tank main portion 252 have a straight cross section in the longitudinal or lengthwise direction. The pressure tank end portions 254 have a hemispherical or semi-ellipsoid shape. However, the pressure tank end portions 254 can be planar, or have an inverted hemispherical or semi-ellipsoid shape, or any one of a variety of other shapes. The vacuum tank 220 is shaped complementary to the pressure tank 250, and the vacuum tank skin 226 of the vacuum tank main portion 222 has a straight cross section in the longitudinal or lengthwise direction. The vacuum tank end portions 224 have a hemispherical or semi-ellipsoid shape, which alternatively can be inverted, or the vacuum tank end portions 224 can be planar or flat. Although not shown in FIG. 39, the tank system 200 includes any one or more of the above-described gap control mechanism 300 for controlling the width of the one or more longitudinal gaps 274 in a manner facilitating movement of the one or more pressure tank skin segments 258 between a retracted position 290 and a fully extended position 294. Further in this regard, any one or more of the components and functionalities associated with the tank system 200 of FIGS. 2-38 are applicable to the tank system 200 of FIG. 39.

As an alternative example to the tank systems 200 of FIGS. 2-39 in which the skins 226, 258 have a straight cross section, a tank system 200 can be provided with a vacuum tank skin 226 and/or pressure tank skin segments 258 that have a scalloped cross section 264 (e.g., FIGS. 40-44) or a sinusoidal cross section 269 (e.g., FIGS. 45-49) in the longitudinal or lengthwise direction. However, the pressure tank skin segments 258 and the vacuum tank skin 226 can be provided in any one of a variety of alternative longitudinal cross sections, and are not limited to the cross sections shown in the figures and described herein. Regardless of the longitudinal cross-sectional shape of the pressure tank skin segments 258 and the vacuum tank skin 226, the skin segment outer surface 260 is preferably complementary to (e.g., identical to) the vacuum tank inner surface 228 of the vacuum tank skin 226. As mentioned above, by making the skin segment outer surface 260 complementary to the vacuum tank inner surface 228, the pressure tank skin segments 258 can be nested within the vacuum tank skin 226, which increases the volumetric efficiency of the pressure tank 250 in storing cryogenic fluid.

Figure 40:
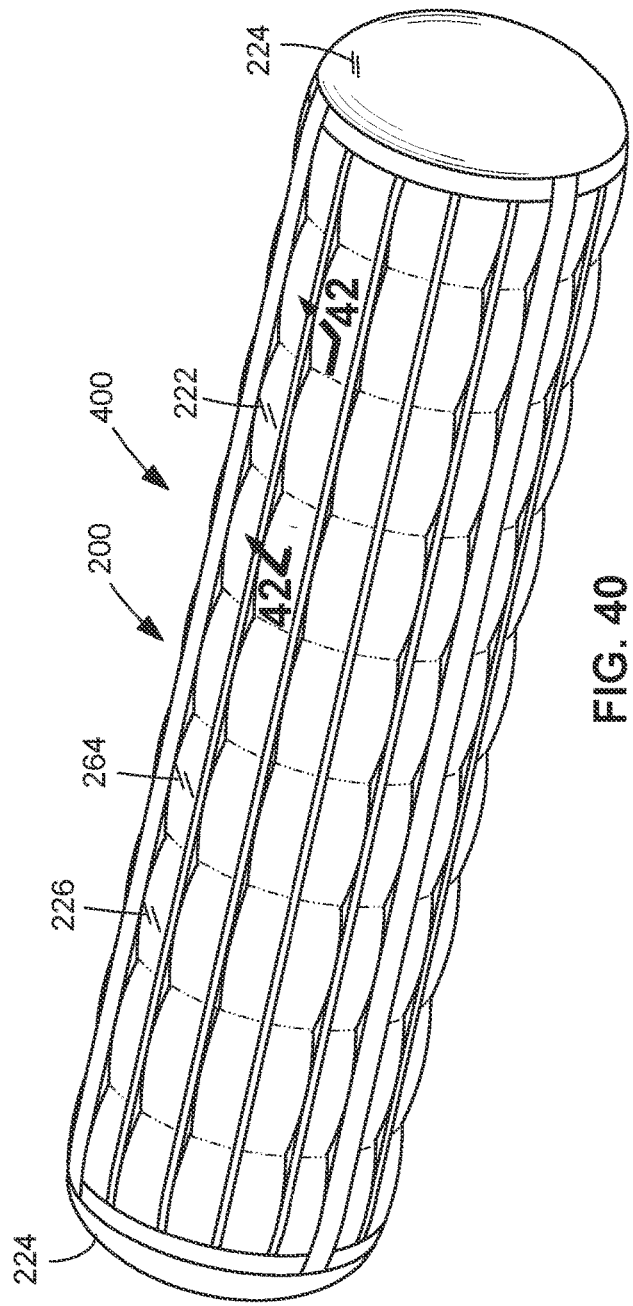
FIG. 40 is a perspective view of an example of a tank system in which the pressure tank skin segments and the vacuum tank skin each having a scalloped cross section in the longitudinal or lengthwise direction.
Figure 41:
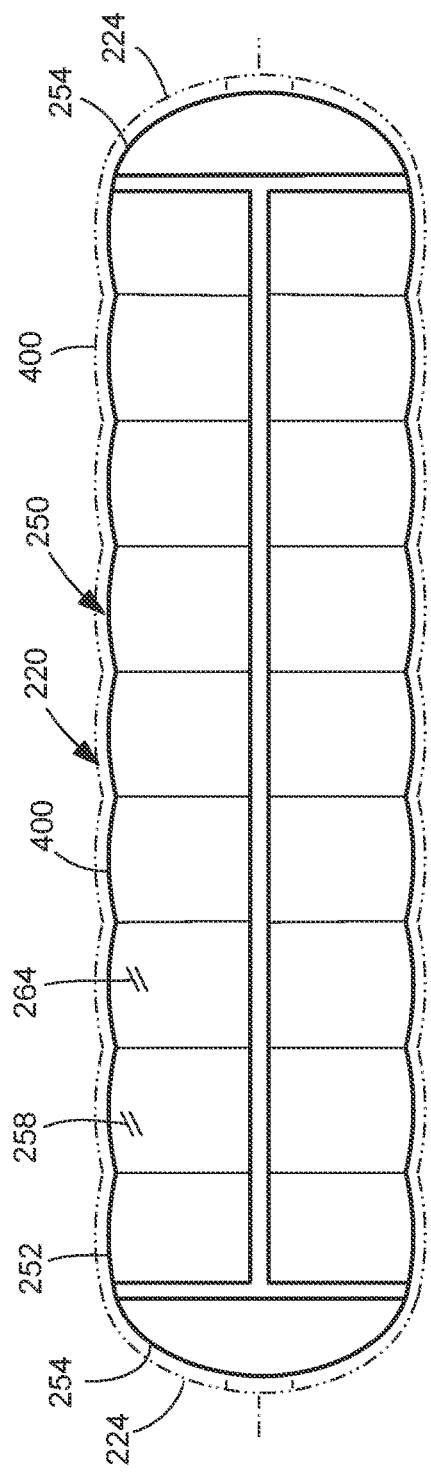
FIG. 41 is a side view of the tank system of FIG. 40 illustrating the profile of the vacuum tank in phantom lines.

Referring to FIG. 40-41, shown is an example of a tank system 200 in which the pressure tank skin segments 258 and the vacuum tank skin 226 each have a scalloped cross section 264 in the longitudinal or lengthwise direction. In FIG. 41, the profile of the vacuum tank skin 226 is shown in phantom lines, and the vacuum tank skin stiffeners 234 are omitted. The pressure tank 250 and the vacuum tank 220 each have a sphero-cylindrical shape. The pressure tank main portion 252 and the vacuum tank main portion 222 each have a straight cylindrical shape 400. However, in other examples not shown, the pressure tank main portion 252 and the vacuum tank main portion 222 can have a tapered cylindrical shape similar to the arrangement shown in FIG. 39. In FIGS. 40-41, the pressure tank end portions 254 have a hemispherical or semi-ellipsoid shape. However, the pressure tank end portions 254 can be planar, or have an inverted hemispherical or semi-ellipsoid shape, or any one of a variety of other shapes. The vacuum tank 220 is shaped complementary to the pressure tank 250, and the vacuum tank end portions 224 have a hemispherical or semi-ellipsoid shape, which alternatively can be inverted, or the vacuum tank end portions 224 can be planar or flat.

Figure 44:
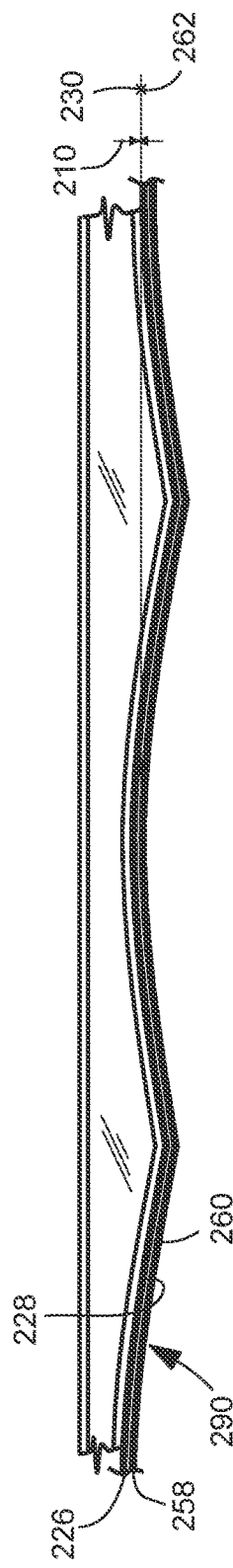
FIG. 44 shows the pressure tank skin segments in the fully extended position.
Figure 43:
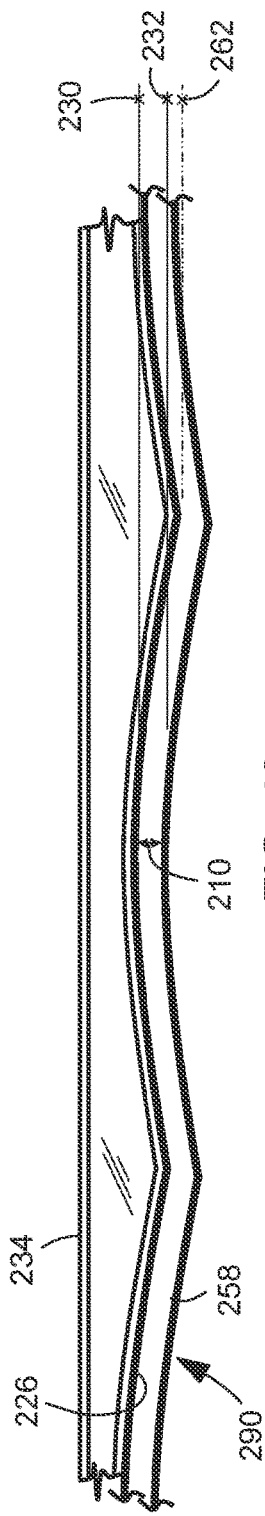
FIG. 43 shows the pressure tank skin segments in the partially extended position in which the pressure tank maximum diameter is greater than the vacuum tank minimum diameter and less than the vacuum tank maximum diameter.
Figure 42:
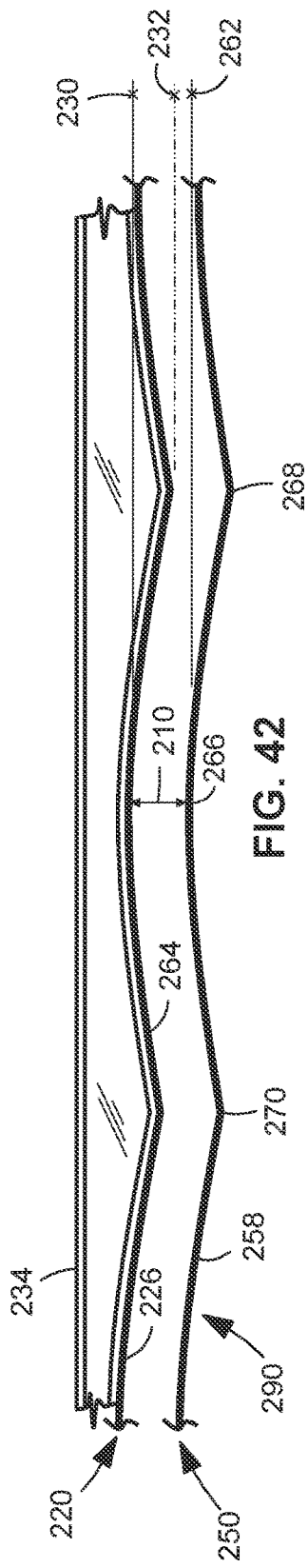
FIG. 42 is a sectional view taken along line 42-42 of FIG. 40 and illustrating the scalloped cross section of the vacuum tank skin and the pressure tank skin segments, shown in the retracted position.

Referring to FIGS. 42-44, shown are sectional views of the tank system 200 of FIGS. 40-41 illustrating the scalloped cross section of the vacuum tank skin 226 and the pressure tank skin segments 258. The scalloped cross section 264 is comprised of alternating peaks 266 and valleys 268, with the peaks 266 being the locations of minimum diameter, and the valleys 268 being the locations of maximum diameter.

FIG. 42 shows the pressure tank skin segments 258 in the retracted position 290 in which the pressure tank maximum diameter 262 is less than the vacuum tank minimum diameter 232, resulting in a relatively large radial gap 210 between the pressure tank skin segments 258 and the vacuum tank skin 226. The size of the radial gap 210 in the retracted position 90 provides clearance for axially installing or removing the pressure tank 250 from an open end (not shown) of the vacuum tank 220 without interference between the two tanks 220, 250.

FIG. 43 shows the pressure tank skin segments 258 in the partially extended position 292 in which the pressure tank maximum diameter 262 is greater than the vacuum tank minimum diameter 232 and less than the vacuum tank maximum diameter 230. The scalloped cross section 264 of the pressure tank skin segments 258 are nested within the scalloped cross section 264 of the vacuum tank skin 226. The ability to nest the pressure tank skin segments 258 within the vacuum tank skin 226 allows for a relatively small radial gap 210 during normal operating conditions, which improves the volumetric efficiency of the pressure tank 250 in storing cryogenic fluid.

FIG. 44 shows the pressure tank skin segments 258 in the fully extended position 294 in which the pressure tank skin segments 258 are in direct physical contact with the vacuum tank skin 226. Because the skin segment outer surface 260 of each pressure tank skin segment 258 is complementary to (e.g., identical in size and shape) the vacuum tank inner surface 228 of the vacuum tank skin 226, the vacuum cavity 208 is eliminated, thereby preventing warm ambient air 206 surrounding the vacuum tank 220 from rushing into the vacuum cavity 208, which would otherwise occur in the event of a rupture in the vacuum tank 220. As mentioned above, by moving the pressure tank skin segments 258 into direct contact with the vacuum tank skin 226, the vacuum cavity 208 is eliminated, and the ability for a volatile mixture of liquid air and cryogenic fluid (e.g., liquid hydrogen or LNG) to form is prevented.

Although not shown, the tank system 200 of FIGS. 40-44 includes any or more of the above-described gap control mechanisms 300 for controlling the width of the longitudinal gaps 274 in a manner facilitating movement of the pressure tank skin segments 258 between the retracted position 290 and the fully extended position 294. In this regard, any one or more of the components and functionalities associated with the tank system 200 and the gap control mechanisms 300 of FIGS. 2-38 are applicable to the tank system 200 of FIGS. 40-44. For example, each of the longitudinal gaps 274 can include one or more skin segment couplers 302 and coupler adjustment devices 308 located at each valley 268 in the scalloped cross section 264 of the pressure tank skin segments 258 similar to the above-described arrangement shown in FIGS. 7, 9, and 10. Alternatively, one or more skin segment couplers 302 and coupler adjustment devices 308 can be located at any interval spacing along the length of each longitudinal gap 274. In another example, the tank system of FIGS. 40-44 can include one or more of the gap control mechanisms 300 similar to the above-described arrangement shown in FIGS. 16-34.

Referring to FIG. 45-49, shown is an example of a tank system 200 in which the pressure tank skin segments 258 and the vacuum tank skin 226 each have a sinusoidal cross section 269 in the longitudinal or lengthwise direction. In FIG. 46, the profile of the vacuum tank skin is shown in phantom lines, and the vacuum tank skin stiffeners 234 are omitted. The tank system of FIGS. 45-49 is similar to the tank system 200 of FIGS. 40-44, in that the pressure tank main portion 252 and the vacuum tank main portion 222 each have a straight cylindrical shape 400, and the pressure tank end portions 254 have a hemispherical or semi-ellipsoid shape. However, the pressure tank main portion 252 and the vacuum tank main portion 222 can each have a linearly tapered cylindrical shape (e.g., FIG. 39), and the pressure tank end portions 254 can be planar, or have an inverted hemispherical or semi-ellipsoid shape, or any one of a variety of other shapes. In still further examples, the vacuum tank main portion 222 and the pressure tank main portion 252 can each have an axial cross-sectional shape and/or area that is non-linearly variable in the lengthwise or longitudinal direction. For example, the axial cross-sectional shape and/or area of the vacuum tank main portion 222 and the pressure tank main portion 252 can be non-linearly tapered, such that when the tank system 200 is viewed from the side (e.g., FIG. 41 or 46), the tank system (e.g., the vacuum tank 220) has a curved profile. In one example, the vacuum tank 220 (and pressure tank 250) can have a curved profile that approximates the outer loft surface or contour of a fuselage 102, such as the fuselage barrel section 104 where the tank system 200 is located in the aircraft 100 of FIG. 1.

Figure 47:
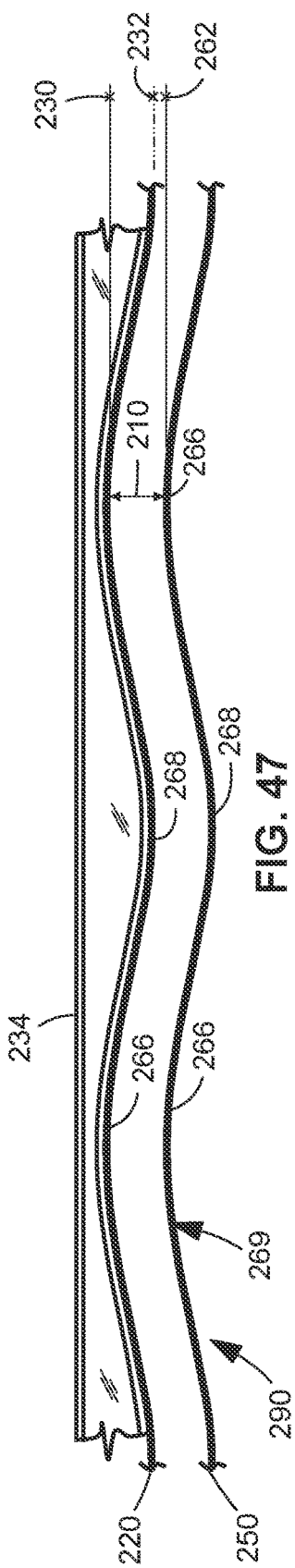
FIG. 47 is a sectional view taken along line 47-47 of FIG. 45 and illustrating the sinusoidal cross section of the vacuum tank skin and the pressure tank skin segments, shown in the retracted position in which the pressure tank maximum diameter is less than the vacuum tank minimum diameter.
Figure 48:
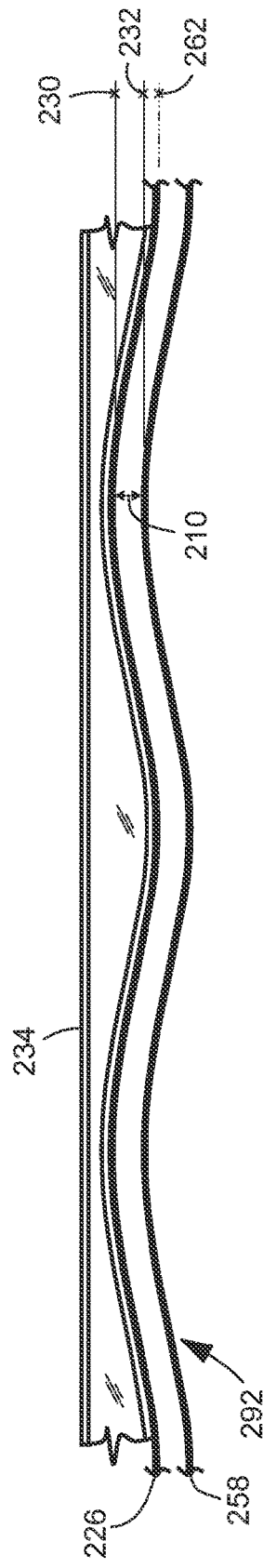
FIG. 48 shows the pressure tank skin segments in the partially extended position in which the pressure tank maximum diameter is greater than the vacuum tank minimum diameter and less than the vacuum tank maximum diameter.
Figure 49:
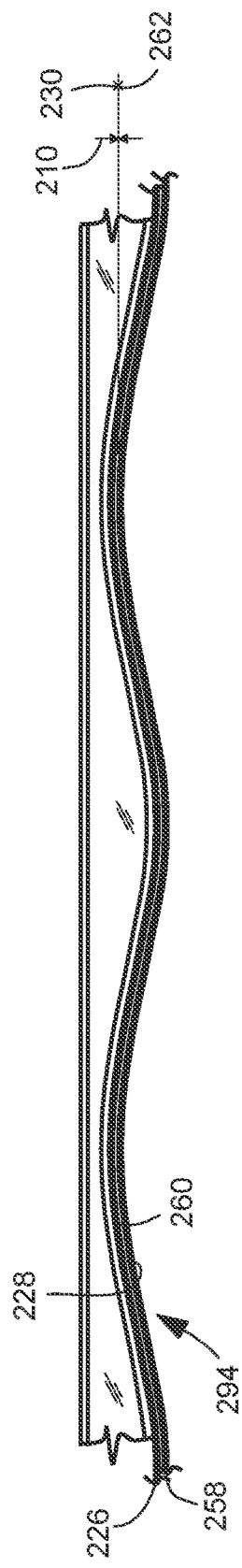
FIG. 49 shows the pressure tank skin segments in the fully extended position, thereby eliminating the radial gap between the pressure tank skin segments and the vacuum tank skin.

FIGS. 47-49 show sectional views of the tank system 200 of FIGS. 40-41 illustrating the sinusoidal cross section 269 of the vacuum tank skin 226 and the pressure tank skin segments 258, and which is comprised of alternating peaks 266 and valleys 268. FIG. 47 shows the pressure tank skin segments 258 in the retracted position 290 in which the pressure tank maximum diameter 262 is less than the vacuum tank minimum diameter 232, resulting in a relatively large radial gap 210 between the pressure tank skin segments 258 and the vacuum tank skin 226 to provide clearance for axially installing or removing the pressure tank 250 from an open end (not shown) of the vacuum tank 220.

FIG. 48 shows the pressure tank skin segments 258 in the partially extended position 292 in which the sinusoidal cross section 269 of the pressure tank skin segments 258 are nested within the sinusoidal cross section 269 of the vacuum tank skin 226, which allows for a relatively small radial gap 210 that increases the volumetric efficiency of the pressure tank 250 in storing cryogenic fluid. FIG. 49 shows the pressure tank skin segments 258 in the fully extended position 294 in which the pressure tank skin segments 258 are in direct physical contact with the vacuum tank skin 226. Because each pressure tank skin segment 258 is complementary to the vacuum tank skin 226, the vacuum cavity 208 is eliminated, and the ability for a volatile mixture of liquid air and cryogenic fluid (e.g., liquid hydrogen or LNG) to form is prevented.

Although not shown, the tank system 200 of FIGS. 45-49 includes any or more of the above-described gap control mechanisms 300 for controlling the width of the longitudinal gaps 274 in a manner facilitating movement of the pressure tank skin segments 258 between the retracted position 290 and the fully extended position 29. In this regard, any one or more of the components and functionalities associated with the tank system 200 and the gap control mechanisms 300 of FIGS. 40-44 are applicable to the tank system 200 of FIGS. 45-49.

In an example of the tank system 200 not shown, the vacuum tank skin 226 of the vacuum tank 220 and/or the one or more pressure tank skin segments 258 of the pressure tank 250 can have a scalloped cross section 264 or a sinusoidal cross section 269 along one or more lengthwise portions, and have a straight cross section along one or more other lengthwise portions. For example, the vacuum tank skin 226 of the vacuum tank 220 and the one or more pressure tank skin segments 258 of the pressure tank 250 can each have a straight cross section at their respective mid-lengths, and the lengthwise portions of each tank on opposite sides of the mid-length locations can have a scalloped cross section 264 or a sinusoidal cross section 269. A straight cross section at the mid-length locations of the vacuum tank skin 226 and the pressure tank skin segments 258 can serve as a region where the pressure tank 250 can be supported by the vacuum tank 220.

Figure 51:
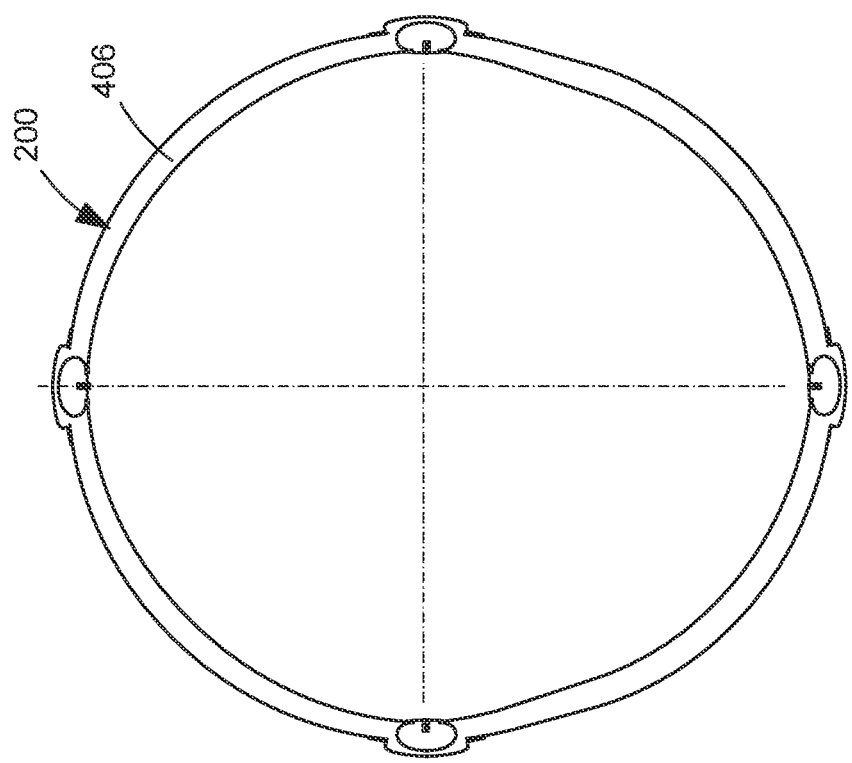
FIG. 51 is an axial section view of an example of a tank system having an oval cross-sectional shape.
Figure 50:
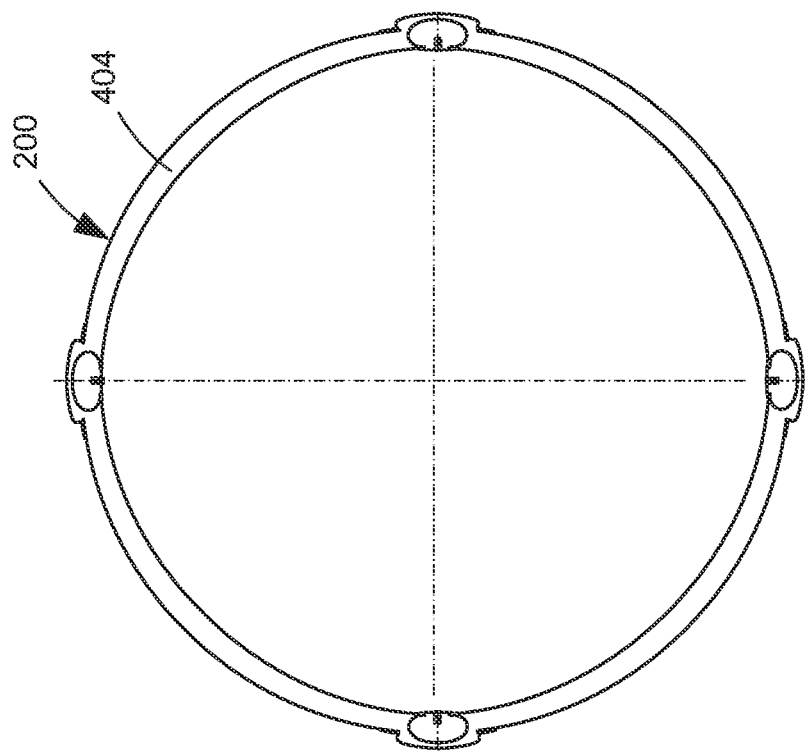
FIG. 50 is an axial section view of an example of a tank system having a circular cross-sectional shape.

Referring to FIGS. 50-51, shown in FIG. 50 is a sectional view of an example of a tank system 200 having a circular cross section 404, similar to the above-described configuration shown in FIG. 5. FIG. 51 shows an example of a tank system 200 having an ovalized cross section 406. The ovalized cross section 406 approximates the cross-sectional shape of the fuselage 102 of a commercial transport aircraft 100 (e.g., FIG. 1). As may be appreciated, the pressure tank 250 and the vacuum tank 220 may be provided in any one of a variety of cross-sectional shapes, and are not limited to a circular shape (e.g., FIG. 50) or an ovalized shape (e.g., FIG. 51).

Figure 52:
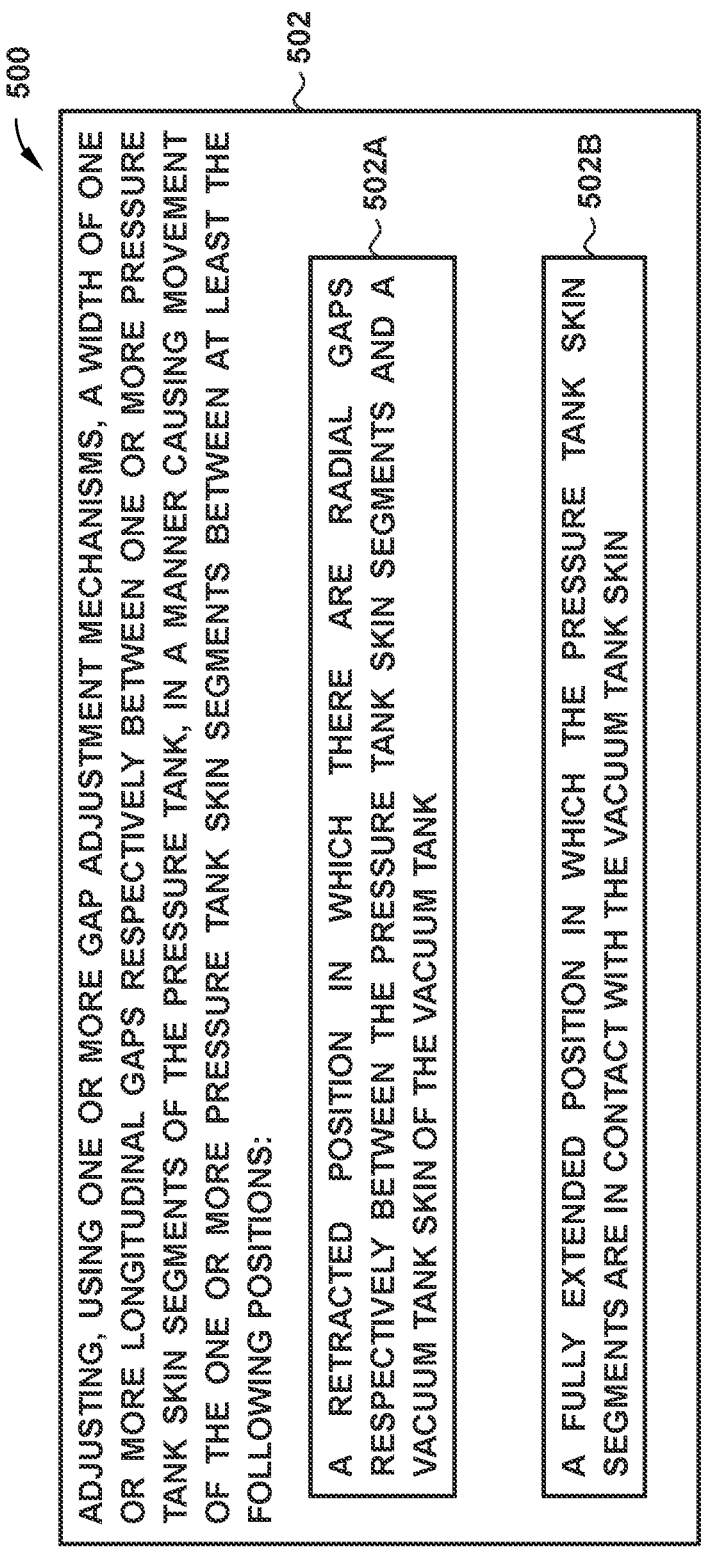
FIG. 52 is a flow diagram of steps included in a method of varying the circumference of a pressure tank mounted within a vacuum tank.

Referring to FIG. 52, shown is a flowchart of a method 500 of varying the circumference of a pressure tank 250 mounted within a vacuum tank 220. The method 500 is described in the context of a tank system 200 as described above. Any one or more of the functionalities described above can be implemented in the method 500.

Step 502 of the method 500 comprises adjusting, using one or more gap control mechanisms 300, the width of one or more longitudinal gaps 274 respectively between one or more pressure tank skin segments 258 of the pressure tank 250, in a manner causing movement of the one or more pressure tank skin segments 258 between a retracted position 290 (block 502A of FIG. 52) and a fully extended position 294 (block 502B of FIG. 52). When the one or more pressure tank skin segments 258 are in the retracted position 290, there are radial gaps 210 respectively between each pressure tank skin segment 258 and the vacuum tank skin 226, as shown in the above-described FIGS. 5, 7-8, 14, 18, 21, 26, 28, 31-35, 42-43, and 47-48. When the one or more pressure tank skin segments 258 are in the fully extended position 294, each pressure tank skin segment 258 is in contact with the vacuum tank skin 226 as shown in the above-described FIGS. 11-12, 15, 29-30, 44, and 49.

Although FIGS. 2-30, 39, 40-41, and 45-46 are shown and described in the context of the pressure tank 250 having 4 pressure tank skin segments 258, step 502 is applicable to tank systems 200 in which the pressure tank 250 has a single pressure tank skin segment 258 as shown in the above-described FIG. 33. In addition, step 502 is applicable to tank systems 200 in which the pressure tank 250 has 2 pressure tank skin segments 258 as shown in above-described FIG. 31. Further still, step 502 is applicable to tank systems 200 in which the pressure tank 250 has 3 pressure tank skin segments 258 (not shown), or more than 4 pressure tank skin segments 258 (not shown).

Step 502 of adjusting the width of the one or more longitudinal gaps 274 can comprise adjusting the width of one or more longitudinal gaps 274 between pressure tank skin segments 258 having a scalloped cross section 264 or the sinusoidal cross section 269 that is complementary to the scalloped cross section 264 or sinusoidal cross section 269 of the vacuum tank skin 226, as shown in the above-described FIGS. 40-49. More specifically, the shape and size of the skin segment outer surface 260 of each pressure tank skin segment 258 matches the shape and size of the vacuum tank inner surface 228 of the vacuum tank skin 226, allowing the scalloped cross section 264 or sinusoidal cross section 269 of the pressure tank skin segments 258 to be nested within the scalloped cross section 264 or sinusoidal cross section 269 of the vacuum tank skin 226.

The method 500 includes sealing the one or more longitudinal gaps 274 respectively using one or more longitudinal gap seals 276, each configured to accommodate variations in the width of the longitudinal gaps 274 caused by movement of the one or more pressure tank skin segments 258 between the retracted position 290 and the fully extended position 294. As described above, each longitudinal gap seal 276 is received within a longitudinal recess 236 as the pressure tank skin segments 258 move from the retracted position 290 (FIGS. 7 and 25) to the fully extended position 294 (FIGS. 11 and 29). In addition to sealing the longitudinal gaps 274 using longitudinal gap seals 276, the method 500 includes sealing the end gap 280 at each end of the tank system 200 using an end gap seal 282, an example of which is shown in FIGS. 13-15. As described above, each end gap seal 282 is configured to accommodate the radial movement of the pressure tank skin segments 258 moving between the retracted position 290 and the fully extended position 294.

Referring to the example of FIGS. 7-12, step 502 of adjusting the width of the one or more longitudinal gaps 274 comprises adjusting, using one or more coupler adjustment devices 308, the length of one or more skin segment couplers 302 interconnecting an adjacent pair of skin segment longitudinal edges 270 associated with each longitudinal gap 274. In FIGS. 7-12 described above, each skin segment coupler 302 is a cable 304 extending across the longitudinal gap 274, and each coupler adjustment device 308 is a cable cutter 310. The cables 304 are in in tension due to the internal pressure 204 (FIG. 5) exerted on the pressure tank skin segments 258 due to pressurization of the cryogenic fluid. In the example of FIG. 7, the cables 304 maintain the pressure tank skin segments 258 in the retracted position 290 under the internal pressure 204 within the pressure tank 250.

Upon the occurrence or anticipation of an emergency condition as described above, the cable cutters 310 are activated, severing all the cables 304 at the one or more longitudinal gaps 274. The internal pressure 204 within the pressure tank 250 urges the one or more pressure tank skin segments 258 radially outward into contact with the vacuum tank skin 226. Because the shape of the pressure tank skin segments 258 matches the shape of the vacuum tank skin 226, the radial gap 210 and associated vacuum cavity 208 between the pressure tank 250 and vacuum tank 220 is eliminated. By eliminating the vacuum cavity 208, the forming of a mixture of liquid air and cryogenic fluid (e.g., liquid hydrogen or LNG) is prevented.

In addition to moving the pressure tank skin segments 258 between the retracted position 290 (FIGS. 25-26) and the fully extended position 294 (FIGS. 29-30), step 502 of adjusting the width of the one or more longitudinal gaps 274 can additionally include moving the one or more pressure tank skin segments 258 into any one of a variety of intermediate positions between the retracted position 290 and the fully extended position 294. For example, step 502 can include moving the one or more pressure tank skin segments 258 to a partially extended position 292 in which the scalloped cross section 264 of each pressure tank skin segment 258 is nested within the scalloped cross section 264 of the vacuum tank skin 226, and there is a relatively small radial gap 210 between each pressure tank skin segment 258 and the vacuum tank skin 226, as shown in as FIGS. 43 and 48. Advantageously, the ability to nest the pressure tank skin segments 258 within the vacuum tank skin 226 increases the volume of cryogenic liquid that can be stored in the pressure tank 250.

Referring to the example of FIGS. 16-29, step 502 of adjusting the width of the one or more longitudinal gaps 274 can be performed using gap control mechanisms 300 that allow for positioning the one or more pressure tank skin segments 258 in a partially extended position 292 as shown in FIGS. 27-28. In this regard, the method can include simultaneously operating a plurality of gap control mechanisms 300 positioned at spaced locations along the pressure tank main portion 252 as shown in FIG. 16. For each gap control mechanism 300, the method includes rotating a center gear 346 via a drive shaft 342 that extends along the tank axis 202 of the pressure tank 250, thereby causing simultaneous rotation of the pinion gears 352 which are respectively engaged the radial members 324, and causing the radial members 324 radially move along the inner spines 322, each of which extends from the drive shaft 342 to a longitudinal gap 274, as shown in FIG. 27. Radial movement of the radial members 324 causes rotation of the pinion gears 352 at each outer mechanism 320, which causes the longitudinal edge drive plates 326 to move toward or away from each other, depending on the direction of rotation of the center gear 346. FIGS. 25-28 show the example where rotation of the center gear 346 is in a direction causing the skin segment longitudinal edges 270 to move away from each other in a diagonal direction toward the vacuum tank skin 226 until arriving at the partially extended position 292 as shown in FIGS. 27-28.

Referring to FIGS. 31-34, step 502 of adjusting the width of the one or more longitudinal gaps 274 can be performed using gap control mechanisms 300 that have only one or more outer mechanisms 320, and no center mechanism 340. In this regard, step 502 includes moving, using a drive assembly 328, a pair of longitudinal edge drive plates 326 in opposite directions in a manner resulting in movement of the one or more pressure tank skin segments 258 between the retracted position 290, the partially extended position 292, and the fully extended position 294. For the example of FIGS. 31-34, the drive assembly 328 at each longitudinal gap 274 comprises one drive shaft 342 extending through all of the pinion gears 352 on one side of the longitudinal gap 274, and another drive shaft 342 extending through all of the pinion gears 352 on an opposite side of the longitudinal gap 274. Synchronized rotation of the drive shafts 342 in opposite directions causes the longitudinal edge drive plates 326 to move in opposite directions, thereby moving the pressure tank skin segments 258 toward or away from the vacuum tank skin 226, depending on the rotational direction of the drive shafts 342.

In some examples, the method 500 includes adjusting the magnitude of the compression force between the vacuum tank skin 226 and the pressure tank skin segments 258 when in the fully extended position 294. For example, it may be desirable to increase the magnitude of the compression force to reduce the probability that ambient air 206 can rush into any gaps between the skins as a result of manufacturing tolerances or structural deflections during an emergency condition (e.g., a crash landing). To allow for adjusting the magnitude of the compression force, the method 500 can include measuring torque on the drive shafts 342 or center gears 346, such as by using a torque sensor (not shown) attached to the drive shaft 342. Torque measurements can be fed to a processor (e.g., flight control computer) for determining the magnitude of the currently applied compression force. The method 500 can include increasing the magnitude of the compression force by slightly rotating the center gear 346 via the drive motor 344 until achieving the desired magnitude of the compression force.

Referring to FIGS. 35-38, the method 500 and optionally include includes separating the vacuum tank 220 into two tank halves along a vacuum tank longitudinal joint 240, to facilitate removal and installation of the pressure tank 250 into the vacuum tank 220. For example, the pressure tank 250 can be removed from the vacuum tank 220 by initially removing joint fasteners (not shown) interconnecting upper and lower joint fittings 242 that make up the vacuum tank longitudinal joint 240 as described above. The method 500 further includes separating the lower tank half 246 of the vacuum tank 220 from the upper tank half 244 by the lower tank half 246 away from the upper tank half 244, thereby exposing the pressure tank 250 as shown in FIG. 37. The method further includes lowering the pressure tank 250 away from the upper tank half 244 of the vacuum tank 220 as shown in FIG. 38, to allow for inspection, maintenance, repair, and/or replacement of the pressure tank 250. The process of installing the pressure tank 250 in the vacuum tank 220 can be performed by reversing the above-described removal process.

Referring to FIGS. 53-54, shown in FIG. 53 is an illustration of a flow diagram of an exemplary aircraft manufacturing and service method 600. FIG. 54 is an illustration of an exemplary block diagram of an aircraft 616. Referring to FIGS. 53 and 54, versions of the disclosure may be described in the context of the aircraft manufacturing and service method 600 as shown in FIG. 53, and the aircraft 616 as shown in FIG. 54.

During pre-production, exemplary aircraft manufacturing and service method 600 may include specification and design 602 of the aircraft and material procurement 604. During manufacturing, component and subassembly manufacturing 606 and system integration 608 of the aircraft 616 takes place. Thereafter, the aircraft 616 may go through certification and delivery 610 in order to be placed in service 612. While in service 612 by a customer, the aircraft 616 may be scheduled for routine maintenance and service 614 (which may also include modification, reconfiguration, refurbishment, and other suitable services).

Each of the processes of the aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 54, the aircraft 616 produced by the exemplary aircraft manufacturing and service method 600 may include an airframe 618 with a plurality of systems 620 and an interior 622. Examples of the plurality of systems 620 may include one or more of a propulsion system 624, an electrical system 626, a hydraulic system 628, and an environmental system 630. Any number of other systems 620 may be included. Although an aerospace example is shown, the principles of the disclosure may be applied to other industries, such as the automotive industry, the construction industry, or another suitable industry.

Methods and systems 620 embodied herein may be employed during any one or more of the stages of the aircraft manufacturing and service method 600. For example, components or subassemblies corresponding to component and subassembly manufacturing 606 may be fabricated or manufactured in a manner similar to components or subassemblies produced while the aircraft 616 is in service 612. Also, one or more apparatus embodiments, method embodiments, or a combination thereof, may be utilized during component and subassembly manufacturing 606 and system integration 608, for example, by substantially expediting assembly of or reducing the cost of the aircraft 616. Similarly, one or more of apparatus embodiments, method embodiments, or a combination thereof, may be utilized while the aircraft 616 is in service 612, for example and without limitation, to maintenance and service 614.

Many modifications and other versions and examples of the disclosure will come to mind to one skilled in the art to which this disclosure pertains having the benefit of the teachings presented in the foregoing descriptions and the associated drawings 110. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A tank system, comprising:
   a vacuum tank having a vacuum tank main portion having a vacuum tank skin;
   a pressure tank mounted within the vacuum tank and having a pressure tank main portion comprised of one or more pressure tank skin segments having a total circumference that is less than that of a complete circle, resulting in one or more longitudinal gaps respectively between the one or more pressure tank skin segments;
   one or more gap control mechanisms configured to control a width of the one or more longitudinal gaps in a manner facilitating movement of the one or more pressure tank skin segments between at least the following positions:

a retracted position in which there is a radial gap between each pressure tank skin segment and the vacuum tank skin; and a fully extended position in which at least a portion of each pressure tank skin segments is in contact with the vacuum tank skin.

2. The tank system of claim 1, wherein the one or more gap control mechanisms comprise:

one or more skin segment couplers mountable at spaced locations along the longitudinal gaps, and each skin segment coupler is configured to interconnect an adjacent pair of skin segment longitudinal edges located on opposite sides of a longitudinal gap; and one or more coupler adjustment devices, each configured to adjust a length of one of the skin segment couplers for adjusting the width of the longitudinal gaps.

3. The tank system of claim 1, wherein the one or more one or more gap control mechanisms comprise:

one or more outer mechanisms mounted proximate the one or more longitudinal gaps, each outer mechanism comprising a pair of a longitudinal edge drive plates respectively coupled to a pair of skin segment longitudinal edges defining on opposite sides of the longitudinal gap; and at least one drive assembly configured to simultaneously move the longitudinal edge drive plates in opposite directions in a manner resulting in movement of the one or more pressure tank skin segments between the retracted position and the fully extended position.

4. The tank system of claim 3, wherein:

the pressure tank main portion is comprised of no more than two pressure tank skin segments, resulting in no more than two longitudinal gaps respectively between the pressure tank skin segments.

5. The tank system of claim 3, wherein the drive assembly comprises:

a drive shaft extending along a tank axis of the pressure tank;

at least one center mechanism, comprising:
  a center gear fixedly mounted on the drive shaft;
  a center bracket non-rotatably mounted on the drive shaft and supporting a plurality of pinion gears engaged to the center gear, and having one or more inner spines extending to the one or more longitudinal gaps;
  one or more radial members slidably mounted on the one or more inner spines and engaged to one of the pinion gears; and
  wherein each of the radial members is operatively coupled to the longitudinal edge drive plates in a manner such that rotation of the center gear via the drive shaft causes rotation of the pinion gears causing translation of the one more radial members respectively along the one or more inner spines, and moving the longitudinal edge drive plates in opposite directions.

6. The tank system of claim 5, wherein:

the pressure tank main portion is comprised of three or more pressure tank skin segments, resulting in three or more longitudinal gaps respectively between the pressure tank skin segments.

7. The tank system of claim 1, further comprising:

one or more longitudinal gap seals respectively sealing the one or more longitudinal gaps and configured to accommodate variations in width of the longitudinal gaps caused by movement of the one or more pressure tank skin segments between the retracted position and the fully extended position.

8. The tank system of claim 1, wherein:

the pressure tank skin segments each have one of a scalloped cross section or a sinusoidal cross section;

the vacuum tank skin has a scalloped cross section or a sinusoidal cross section; and the scalloped cross section or sinusoidal cross section of the pressure tank skin segments is complementary to the scalloped cross section or sinusoidal cross section of the vacuum tank skin.

9. The tank system of claim 8, wherein:

the pressure tank skin segments each have a skin segment outer surface;

the vacuum tank skin has a vacuum tank inner surface; and the skin segment outer surface is identical to the vacuum tank inner surface.

10. The tank system of claim 9, wherein:

the pressure tank skin segments are movable into a partially extended position in which the scalloped cross section or a sinusoidal cross section of each pressure tank skin segment is nested within the scalloped cross section or a sinusoidal cross section of the vacuum tank skin, and there is a radial gap between each pressure tank skin segment and the vacuum tank skin.

11. The tank system of claim 9, wherein:

the vacuum tank has vacuum tank longitudinal joints on opposite sides of the vacuum tank for separating the vacuum tank into two tank halves to facilitate removal and installation of the pressure tank into the vacuum tank.

12. An aircraft, comprising:

a fuselage;

a tank system included with the fuselage and comprising:
  a vacuum tank having a vacuum tank main portion having a vacuum tank skin;
  a pressure tank mounted within the vacuum tank and having a pressure tank main portion comprised of one or more pressure tank skin segments having a total circumference that is less than that of a complete circle, resulting in one or more longitudinal gaps respectively between the one or more pressure tank skin segments;
  one or more gap control mechanisms configured to control a width of the one or more longitudinal gaps in a manner facilitating movement of the one or more pressure tank skin segments between at least the following positions:
    a retracted position in which there is a radial gap between each pressure tank skin segment and the vacuum tank skin; and
    a fully extended position in which the pressure tank skin segments are in contact with the vacuum tank skin.

13. A method of varying a circumference of a pressure tank mounted within a vacuum tank, comprising:

adjusting, using one or more gap control mechanisms, a width of one or more longitudinal gaps respectively between one or more pressure tank skin segments of the pressure tank, in a manner causing movement of the one or more pressure tank skin segments between at least the following positions:

a retracted position in which there is a radial gap respectively between each pressure tank skin segment and a vacuum tank skin of the vacuum tank; and a fully extended position in which the pressure tank skin segments are in contact with the vacuum tank skin.

14. The method of claim 13, wherein adjusting the width of the one or more longitudinal gaps comprises:
adjusting, using one or more coupler adjustment devices, a length of one or more skin segment couplers interconnecting an adjacent pair of skin segment longitudinal edges associated with each longitudinal gap.

15. The method of claim 13, wherein adjusting the width of the one or more longitudinal gaps comprises performing the following at each longitudinal gap:
moving, using a drive assembly, a pair of longitudinal edge drive plates in opposite directions in a manner resulting in movement of the one or more pressure tank skin segments between the retracted position and the fully extended position.

16. The method of claim 15, wherein moving a pair of longitudinal edge drive plates in opposite directions at each longitudinal gap comprises:
rotating a center gear via a drive shaft extending along a tank axis of the pressure tank, to cause simultaneous rotation of a plurality of pinion gears engaged to a plurality of radial members, in a manner causing translation of a plurality of the radial members respectively along a plurality of inner spines, each extending radially from the drive shaft to a different one of the longitudinal gaps.

17. The method of claim 15, further comprising:
sealing the one or more longitudinal gaps respectively using one or more longitudinal gap seals, each configured to accommodate variations in the width of the longitudinal gaps caused by movement of the one or more pressure tank skin segments between the retracted position and the fully extended position.

18. The method of claim 13, wherein adjusting the width of the one or more longitudinal gaps comprises:
adjusting the width of the one or more longitudinal gaps between pressure tank skin segments having a scalloped cross section that is complementary to a scalloped cross section of the vacuum tank skin.

19. The method of claim 18, wherein adjusting the width of the one or more longitudinal gaps comprises:
moving the pressure tank skin segments into a partially extended position in which the scalloped cross section of each pressure tank skin segment is nested within the scalloped cross section of the vacuum tank skin, and there is a radial gap between each pressure tank skin segment and the vacuum tank skin.

20. The method of claim 13, further comprising:
separating the vacuum tank into two tank halves along vacuum tank longitudinal joints extending along diametrically opposite sides of the pressure tank, to facilitate removal and installation of the pressure tank into the vacuum tank.

* * * * *